(12) United States Patent
Nakao et al.

(10) Patent No.: US 7,376,056 B2
(45) Date of Patent: May 20, 2008

(54) METHOD AND APPARATUS FOR READING ADDRESS INFORMATION FROM AN OPTICAL DISC MEDIUM

(75) Inventors: Masahito Nakao, Kadoma (JP); Shigeru Furumiya, Himeji (JP); Hiromichi Ishibashi, Ibaraki (JP); Junichi Minamino, Nara (JP); Naohiro Kimura, Uji (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 446 days.

(21) Appl. No.: 10/346,856

(22) Filed: Jan. 17, 2003

(65) Prior Publication Data

US 2003/0137911 A1 Jul. 24, 2003

(30) Foreign Application Priority Data

Jan. 21, 2002 (JP) .............................. 2002-011339
Mar. 29, 2002 (JP) .............................. 2002-096451

(51) Int. Cl.
 *G11B 7/00* (2006.01)
(52) U.S. Cl. ................................ 369/47.22; 369/59.25
(58) Field of Classification Search ............. 369/47.22, 369/53.35, 275.4
See application file for complete search history.

(56) References Cited

U.S. PATENT DOCUMENTS

| | | | | |
|---|---|---|---|---|
| 5,724,330 A | * | 3/1998 | Kobayashi et al. | ....... 369/59.25 |
| 6,122,233 A | * | 9/2000 | Iketani et al. | ............. 369/53.35 |
| 6,201,778 B1 | * | 3/2001 | Sensyu | ..................... 369/53.34 |
| 6,674,700 B2 | * | 1/2004 | Minamino et al. | ....... 369/47.22 |
| 6,724,708 B2 | * | 4/2004 | Ishibashi et al. | ......... 369/59.25 |
| 6,744,718 B1 | * | 6/2004 | Ko et al. | ................. 369/47.22 |
| 6,947,364 B1 | * | 9/2005 | Hogan et al. | ............ 369/53.45 |
| 7,123,557 B2 | | 10/2006 | Heemskerk et al. | |
| 2002/0110067 A1 | * | 8/2002 | Kondo et al. | ............ 369/275.4 |
| 2002/0145947 A1 | * | 10/2002 | Minamino et al. | ............. 369/1 |

(Continued)

FOREIGN PATENT DOCUMENTS

JP    2003-123267 A    4/2003

OTHER PUBLICATIONS

Ogawa, J., "Next Generation Optical Disc", AV/IT Development Group, Sony Corp., We-A-03 (Plenary), ISOM 2001 Technical Digest, p. 6-7.

*Primary Examiner*—William Korzuch
*Assistant Examiner*—Nathan Danielsen
(74) *Attorney, Agent, or Firm*—Panitch Schwarze Belisario & Nadel LLP

(57) ABSTRACT

A method for reading address information from an optical disc with a wobbled track groove includes the steps of: obtaining a sine wave address signal, a first address signal representing a first groove region with sine wave wobbled portions and an inverted phase portion, and a second address signal representing a second groove region with steep inward or outward displacements; multiplying a first reference signal, being phase-locked to, and having the same frequency as, the sine wave address signal, and the first address signal together to obtain a first multiplied signal; multiplying a second reference signal, being phase-locked to, and having a frequency twice as high as, the sine wave address signal, and the second address signal together to obtain a second multiplied signal; integrating the first multiplied signal and the second multiplied signal separately to obtain a first integral and a second integral, respectively; and adding the first and second integrals together.

14 Claims, 20 Drawing Sheets

U.S. PATENT DOCUMENTS

2003/0002416 A1    1/2003  Furumiya et al.
2003/0117915 A1*   6/2003  Minamino et al. ....... 369/47.22

2003/0223347 A1*  12/2003  Minamino et al. ....... 369/47.22

* cited by examiner

METHOD AND APPARATUS FOR READING ADDRESS INFORMATION FROM AN OPTICAL DISC MEDIUM

BACKGROUND OF THE INVENTION

1. Field of the Invention

The present invention relates to a method and apparatus for reading out address information from an optical disc medium, on which the address information was recorded or represented by varying the shape of a track groove.

2. Description of the Related Art

A groove recording technique is one of known methods of recording or representing address information on a recording track of a recordable or rewritable optical disc. In the groove recording technique, the track groove of an optical disc to record an optical signal thereon is wobbled and the frequency, phase or amplitude of the wobbled groove is changed, thereby recording or representing address information on the groove.

FIG. 1 illustrates various shapes of wobbled grooves 100 through 103. The wobble of the groove 100 consists essentially of a sine wave alone. The groove 101 also has a sine wave wobble but includes a phase inverted portion as well. ISOM 2001 Technical Digest, pp. 6–7, discloses the technique of representing address information by the grooves 100 and 101. More specifically, according to the technique, data "0" and data "1" are represented by the non-inverted phase and the inverted phase of the sine wave, respectively.

The groove 102 shown in FIG. 1 has a wobbled pattern, of which the displacements toward the center of the disc are relatively steep with respect to the tracking direction and of which the displacements away from the center of the disc are relatively gentle with respect to the tracking direction. Contrarily, the groove 103 shown in FIG. 1 has a wobbled pattern, of which the displacements away from the center of the disc are relatively steep with respect to the tracking direction and of which the displacements toward the center of the disc are relatively gentle with respect to the tracking direction. In FIG. 1, the downside is closer to the center (or the lead-in area) of the disc, while the upside is closer to the edge (or the lead-out area) of the disc. PCT International Application No. WO 01/52250 discloses the technique of representing address information by the grooves 102 and 103. More specifically, according to the technique, data "0" and data "1" are allocated to the grooves 102 and 103, respectively.

FIG. 2A is a block diagram showing a circuit for reading out an address read signal and a user data read signal from an optical disc by recognizing the various shapes of the wobbled groove. FIG. 2B schematically shows how a laser beam 201 scans the groove 200 on the optical disc. Specifically, the laser beam 201 is focused onto, and reflected from, the groove 200 of the optical disc. Then, the reflected beam forms a beam spot 202 over the detectors 203 and 204 of the circuit. As shown in FIG. 2A, the detectors 203 and 204 are spaced apart from each other in a radial direction of the disc. Each of the detectors 203 and 204 supplies an output signal, representing the intensity of the received laser beam, to a differential amplifier 205. On receiving the output signals of the detectors 203 and 204, the differential amplifier 205 calculates a difference between these two signals, thereby outputting an address read signal 206. In this manner, a wobble signal 206 representing the shape of the groove 200 can be obtained as shown in FIG. 2B. The outputs of the detectors 203 and 204 are added together by an adder 207 to produce a user data read signal 208.

When data is read out from an optical disc, the quality of the read signal may deteriorate for various reasons including: interference between adjacent tracks; variation in the tilt angle defined by a laser beam with respect to the disc surface of the optical disc; and dust or scratches on the data recording side. In that case, the quality of the address read signal may also deteriorate and the address information may not be detected accurately. Particularly when the optical disc drive used can write, such inaccurate detection of address information may lead to erroneous erasure of user data that has already been recorded on the disc.

SUMMARY OF THE INVENTION

In order to overcome the problems described above, preferred embodiments of the present invention provide a method and apparatus for reading out address information highly accurately and reliably even if the quality of an address read signal has deteriorated for some reason.

A preferred embodiment of the present invention provides a method for reading out address information from an optical disc medium. The optical disc medium preferably includes a wobbled track groove on which a sine wave wobbled region, a first region and a second region are present and on which the same address information is recorded on the first and second regions. The first region preferably includes a plurality of sine wave wobbled portions, at least one of which has a phase inverted to that of the other portions. The second region preferably includes a plurality of wobbled portions that are steeply displaced either toward or away from the center of the optical disc medium with respect to a direction in which a laser beam scans the wobbled track groove. The method preferably includes the step of a) detecting the laser beam that has been reflected from the wobbled track groove to obtain a sine wave address signal, a first address signal and a second address signal that represent wobble of the sine wave wobbled region, wobble of the first region, and wobble of the second region, respectively. The method preferably further includes the step of b) multiplying a first reference signal and the first address signal together to obtain a first multiplied signal. The first reference signal is preferably phase-locked to, and has the same frequency as, the sine wave address signal. The method preferably further includes the step of c) multiplying a second reference signal and the second address signal together to obtain a second multiplied signal. The second reference signal is preferably phase-locked to the sine wave address signal and preferably has a frequency that is an even number of times as high as that of the sine wave address signal. The method preferably further includes the steps of d) integrating the first multiplied signal and the second multiplied signal separately to obtain a first integral and a second integral, respectively, and e) adding the first and second integrals together to obtain a sum and thereby detecting the address information based on the sum.

In one preferred embodiment of the present invention, the method preferably further includes, between the steps a) and b), the step f) of passing the first address signal through a first band-pass filter having a predetermined pass band and then getting an output signal of the first band-pass filter digitized by a first comparator; and the step g) of passing the second address signal through a second band-pass filter having a predetermined pass band and then getting an output signal of the second band-pass filter digitized by a second comparator.

In that case, the multiplying step b) preferably includes the step of getting a digital signal as the first reference signal and the digitized first address signal multiplied together by a first exclusive OR circuit. The multiplying step c) preferably includes the step of getting another digital signal as the second reference signal and the digitized second address signal multiplied together by a second exclusive OR circuit.

Another preferred embodiment of the present invention provides a method for reading out address information from an optical disc medium. The optical disc medium preferably includes a wobbled track groove on which a sine wave wobbled region, a first region and a second region are present and on which the same address information is recorded on the first and second regions. The first region preferably includes a plurality of sine wave wobbled portions, at least one of which has a phase inverted to that of the other portions. The second region preferably includes a plurality of wobbled portions that are steeply displaced either toward or away from the center of the optical disc medium with respect to a direction in which a laser beam scans the wobbled track groove. The method preferably includes the steps of a) detecting a first address detection signal, representing wobble of the first region of the track groove, from the first region and a second address detection signal, representing wobble of the second region of the track groove, from the second region and b) selecting either address information to be obtained from the first address detection signal or address information to be obtained from the second address detection signal in accordance with eye aperture values of the first and second address detection signals.

Still another preferred embodiment of the present invention provides a method for reading out address information from an optical disc medium. The optical disc medium preferably includes a wobbled track groove on which a sine wave wobbled region, a first region and a second region are present and on which the same address information is recorded on the first and second regions. The first region preferably includes a plurality of sine wave wobbled portions, at least one of which has a phase inverted to that of the other portions. The second region preferably includes a plurality of wobbled portions that are steeply displaced either toward or away from the center of the optical disc medium with respect to a direction in which a laser beam scans the wobbled track groove. The method preferably includes the steps of reading out user data from the track groove, and selecting either address information to be obtained from the first region of the track groove or address information to be obtained from the second region of the track groove by reference to a property of errors that have occurred in the user data.

In one preferred embodiment of the present invention, the selecting step may include the step of selecting the address information by reference to a frequency of occurrence of burst errors in the user data.

In an alternative preferred embodiment, the selecting step may include the step of selecting the address information by reference to an average length of burst errors in the user data.

In another alternative preferred embodiment, the selecting step may include the step of selecting the address information by reference to a location of a burst error in the user data.

Yet another preferred embodiment of the present invention provides a program that is defined so as to make a computer carry out the respective processing steps of the method according to any of the preferred embodiments of the present invention described above.

Yet another preferred embodiment of the present invention provides a computer readable storage medium having stored thereon that program.

Yet another preferred embodiment of the present invention provides an apparatus for reading out address information from an optical disc medium. The optical disc medium preferably includes a wobbled track groove on which a sine wave wobbled region, a first region and a second region are present and on which the same address information is recorded on the first and second regions. The first region preferably includes a plurality of sine wave wobbled portions, at least one of which has a phase inverted to that of the other portions. The second region preferably includes a plurality of wobbled portions that are steeply displaced either toward or away from the center of the optical disc medium with respect to a direction in which a laser beam scans the wobbled track groove. The apparatus preferably includes signal reading means for detecting the laser beam that has been reflected from the wobbled track groove to obtain a sine wave address signal, a first address signal and a second address signal that represent wobble of the sine wave wobbled region, wobble of the first region, and wobble of the second region, respectively. The apparatus preferably further includes signal generating means for generating a first reference signal and a second reference signal. The first reference signal is preferably phase-locked to, and has the same frequency as, the sine wave address signal. The second reference signal is preferably phase-locked to the sine wave address signal and preferably has a frequency that is an even number of times as high as that of the sine wave address signal. The apparatus preferably further includes multiplying means for multiplying the first reference signal and the first address signal together and the second reference signal and the second address signal together to obtain a first multiplied signal and a second multiplied signal, respectively. The apparatus preferably further includes integrating means for integrating the first multiplied signal and the second multiplied signal separately to obtain a first integral and a second integral, respectively. The apparatus preferably further includes adding means for adding the first and second integrals together to obtain a sum and decision means for detecting the address information based on the sum.

In one preferred embodiment of the present invention, the apparatus preferably further includes sample-and-hold means for sampling and holding the first integral or the second integral.

In this particular preferred embodiment, the multiplying means preferably includes a first multiplier for multiplying the first reference signal and the first address signal together, and a second multiplier for multiplying the second reference signal and the second address signal together. The integrating means preferably includes a first integrator circuit for integrating the first multiplied signal, and a second integrator circuit for integrating the second multiplied signal.

Yet another preferred embodiment of the present invention provides an apparatus for reading out address information from an optical disc medium. The optical disc medium preferably includes a wobbled track groove on which a sine wave wobbled region, a first region and a second region are present and on which the same address information is recorded on the first and second regions. The first region preferably includes a plurality of sine wave wobbled portions, at least one of which has a phase inverted to that of the other portions. The second region preferably includes a plurality of wobbled portions that are steeply displaced either toward or away from the center of the optical disc medium with respect to a direction in which a laser beam scans the wobbled track groove. The apparatus preferably includes signal reading means for detecting the laser beam that has been reflected from the wobbled track groove to obtain a sine wave address signal, a first address signal and a second address signal that represent wobble of the sine wave wobbled region, wobble of the first region, and wobble of the second region, respectively. The apparatus preferably further includes signal generating means for generating a first reference signal and a second reference signal. The first reference signal is preferably phase-locked to, and has the same frequency as, the sine wave address signal. The second reference signal is preferably phase-locked to the sine wave address signal and preferably has a frequency that is an even number of times as high as that of the sine wave address signal. The apparatus preferably further includes multiplying means for multiplying the first reference signal and the first address signal together and the second reference signal and the second address signal together to obtain a first multiplied signal and a second multiplied signal, respectively. The apparatus preferably further includes integrating means for integrating the first multiplied signal and the second multiplied signal separately to obtain a first integral and a second integral, respectively. The apparatus preferably further includes decision means for deriving first address information from the first integral and second address information from the second integral, respectively. The apparatus preferably further includes selecting means for selecting either the first address information or the second address information by comparing absolute values of the first and second integrals to each other.

Yet another preferred embodiment of the present invention provides an apparatus for reading out address information from an optical disc medium. The optical disc medium preferably includes a wobbled track groove on which a sine wave wobbled region, a first region and a second region are present and on which the same address information is recorded on the first and second regions. The first region preferably includes a plurality of sine wave wobbled portions, at least one of which has a phase inverted to that of the other portions. The second region preferably includes a plurality of wobbled portions that are steeply displaced either toward or away from the center of the optical disc medium with respect to a direction in which a laser beam scans the wobbled track groove. The apparatus preferably includes signal reading means for detecting the laser beam that has been reflected from the wobbled track groove to obtain a first address signal representing wobble of the first region, a second address signal representing wobble of the second region, and a user data read signal representing an intensity of the reflected laser beam. The apparatus preferably further includes error detecting means for detecting errors in user data from the user data read signal. The apparatus preferably further includes selecting means for selecting either the first address signal or the second address signal based on a result obtained by the error detecting means. The apparatus preferably further includes address detecting means for acquiring the address information from the first address signal or the second address signal based on a result obtained by the selecting means.

Yet another preferred embodiment of the present invention provides an apparatus for reading out address information from an optical disc medium. The optical disc medium preferably includes a wobbled track groove on which a sine wave wobbled region, a first region and a second region are present and on which the same address information is recorded on the first and second regions. The first region preferably includes a plurality of sine wave wobbled portions, at least one of which has a phase inverted to that of the other portions. The second region preferably includes a plurality of wobbled portions that are steeply displaced either toward or away from the center of the optical disc medium with respect to a direction in which a laser beam scans the wobbled track groove. The apparatus preferably includes signal reading means for detecting the laser beam that has been reflected from the wobbled track groove to obtain a first address signal representing wobble of the first region, a second address signal representing wobble of the second region, and a user data read signal representing an intensity of the reflected laser beam. The apparatus preferably further includes error detecting means for detecting errors in user data from the user data read signal. The apparatus preferably further includes address detecting means for acquiring first address information from the first address signal and second address information from the second address signal. The apparatus preferably further includes address information selecting means for selecting either the first address information or the second address information based on a result obtained by the error detecting means.

In one preferred embodiment of the present invention, the error detecting means may detect a frequency of occurrence of burst errors in the user data.

In an alternative preferred embodiment, the error detecting means may detect an average length of burst errors in the user data.

In another alternative preferred embodiment, the error detecting means may locate a burst error in the user data.

Yet another preferred embodiment of the present invention provides an optical disc drive that includes the apparatus according to any of the preferred embodiments of the present invention described above.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 3:
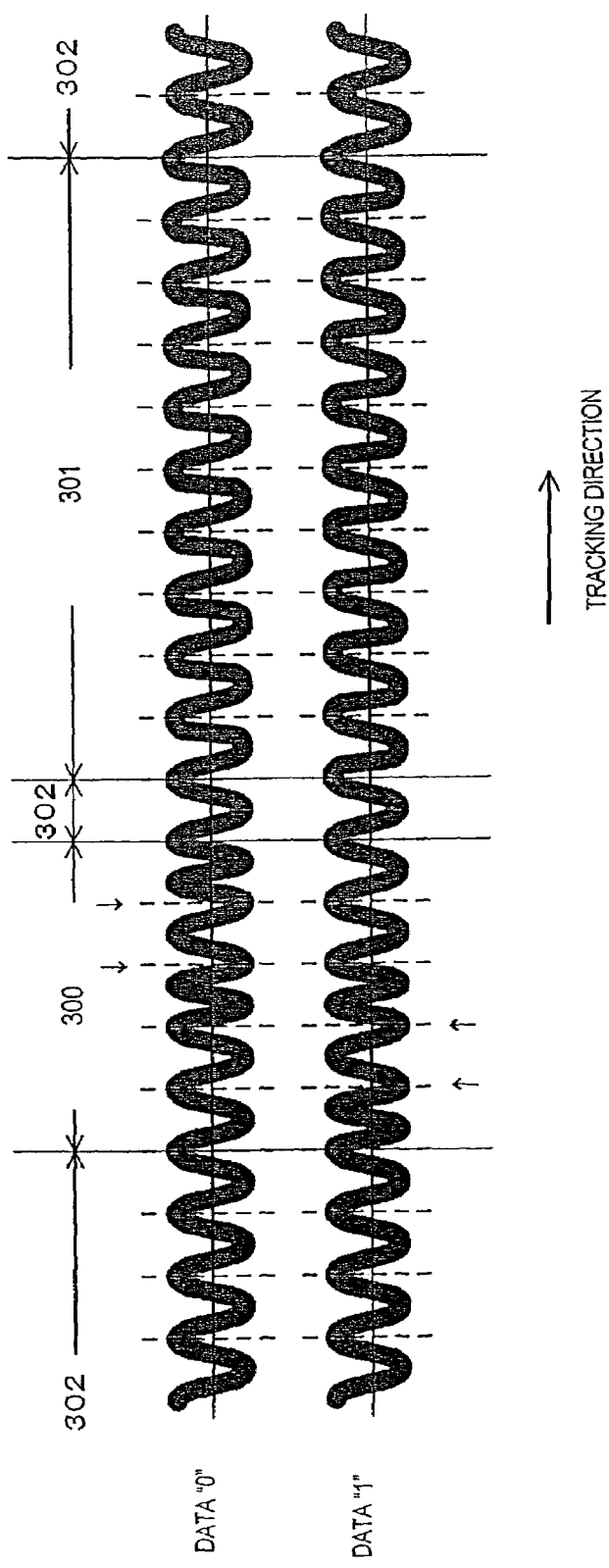
FIG. 3 schematically shows wobbled shapes of a groove on an optical disc according to a preferred embodiment of the present invention.

First, the groove shapes of an optical disc for use in a preferred embodiment of the present invention will be described with reference to FIG. 3. FIG. 3 schematically illustrates the planar shapes of a groove on the data layer of the optical disc. The optical disc for use in various preferred embodiments of the present invention includes a spiral groove that is wobbled in a radial direction of the disc.

As shown in FIG. 3, the groove includes a sine wave wobbled region 302, a first region 300 and a second region 301. In the sine wave wobbled region 302, the wobble pattern thereof consists essentially of a sine wave. In the first region 300, the wobble pattern thereof includes multiple sine wave portions, at least one of which has an inverted phase. In the second region 301, the wobble pattern thereof includes wobbled portions that are displaced relatively steeply either toward or away from the center of the disc with respect to the tracking direction. In this optical disc, the same address information is represented by, and recorded on, the first and second regions 300 and 301.

Specifically, the upper groove shown in FIG. 3 is a portion of the groove, in which data "0" of the address information is allocated to the first and second regions 300 and 301. On the other hand, the lower groove shown in FIG. 3 is another portion of the groove, in which data "1" of the address information is allocated to the first and second regions 300 and 301. In the first region 300 of each of these two groove portions, the sine wave portion as indicated by the arrows has an inverted phase with respect to the other sine wave portions. In the preferred embodiment shown in FIG. 3, if the phase-inverted portion is located in the first half of the first region 300, then data "1" is allocated to the first region 300. On the other hand, if the phase-inverted portion is located in the second half of the first region 300, then data "0" is allocated to the first region 300. That is to say, the data "0" or data "1" is represented by the location of the phase-inverted portion in the first region 300.

In the second region 301 on the other hand, the data "0" or data "1" is represented by the direction of the steep displacements of the wobble pattern, i.e., whether the steep displacements are directed toward the center of the disc or the edge of the disc. In FIG. 3, the downside is closer to the center (i.e., the lead-in area) of the disc, while the upside is closer to the edge (i.e., the lead-out area) of the disc. Accordingly, in the preferred embodiment illustrated in FIG. 3, if the inwardly displaced portions of the wobble pattern are steeper than the outwardly displaced portions thereof, the data "0" is allocated to the second region 301. On the other hand, if the outwardly displaced portions of the wobble pattern are steeper than the inwardly displaced portions thereof, the data "1" is allocated to the second region 301. When the data "0" and data "1" are represented by these wobble shapes, the address read signal to be obtained from the optical disc also has a signal waveform corresponding to such a wobble pattern. That is to say, the signal waveform rises sometimes steeply and sometimes gently in accordance with the wobble pattern.

As will be described in detail later, if the laser beam reflected from the optical disc is subjected to signal processing such that the resultant wobble read signal is integrated, it is possible to determine whether the first and second regions 300 and 301 represent the data "0" or data "1".

Although not shown in FIG. 3, a SYNC mark is provided just before the first region 300 to start the signal processing synchronously with the beginning of the first region 300. That is to say, the beginning and the end of each region are detectable by reference to the SYNC mark. Also, when user data is read out from the optical disc, the quality of the user data read signal may deteriorate for various reasons including variation in the tilt angle defined by the laser beam with respect to the disc surface and dust or scratches on the data recording side as described above. In that case, the user data may include some errors. To eliminate those errors from the user data read signal, error-corrected user data may be separately recorded on the disc and the user data read signal may be subjected to error correction processing by reference to the error-corrected user data. Then, those errors can be corrected.

Embodiment 1

Hereinafter, a method and apparatus for reading out address information according to a first specific preferred embodiment of the present invention will be described. In the method and apparatus of this first preferred embodiment, the signals to be obtained from the first and second regions 300 and 301 of the groove on the optical disc are separately subjected to multiplication and integration processes and the two resultant integrals are added together, thereby detecting address information.

Figure 4:
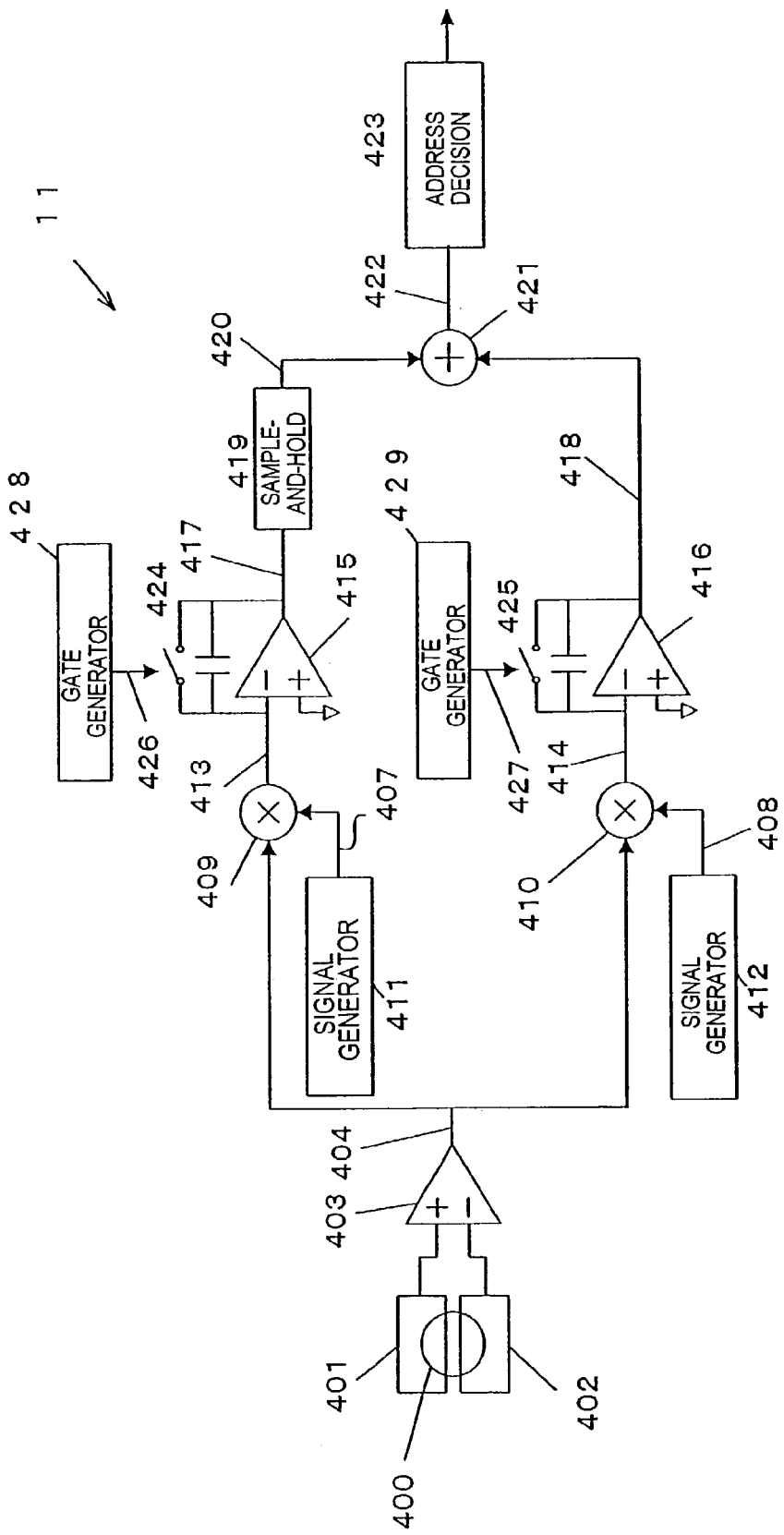
FIG. 4 is a block diagram showing a configuration for an address information reader according to a first specific preferred embodiment of the present invention.
Figure 5:
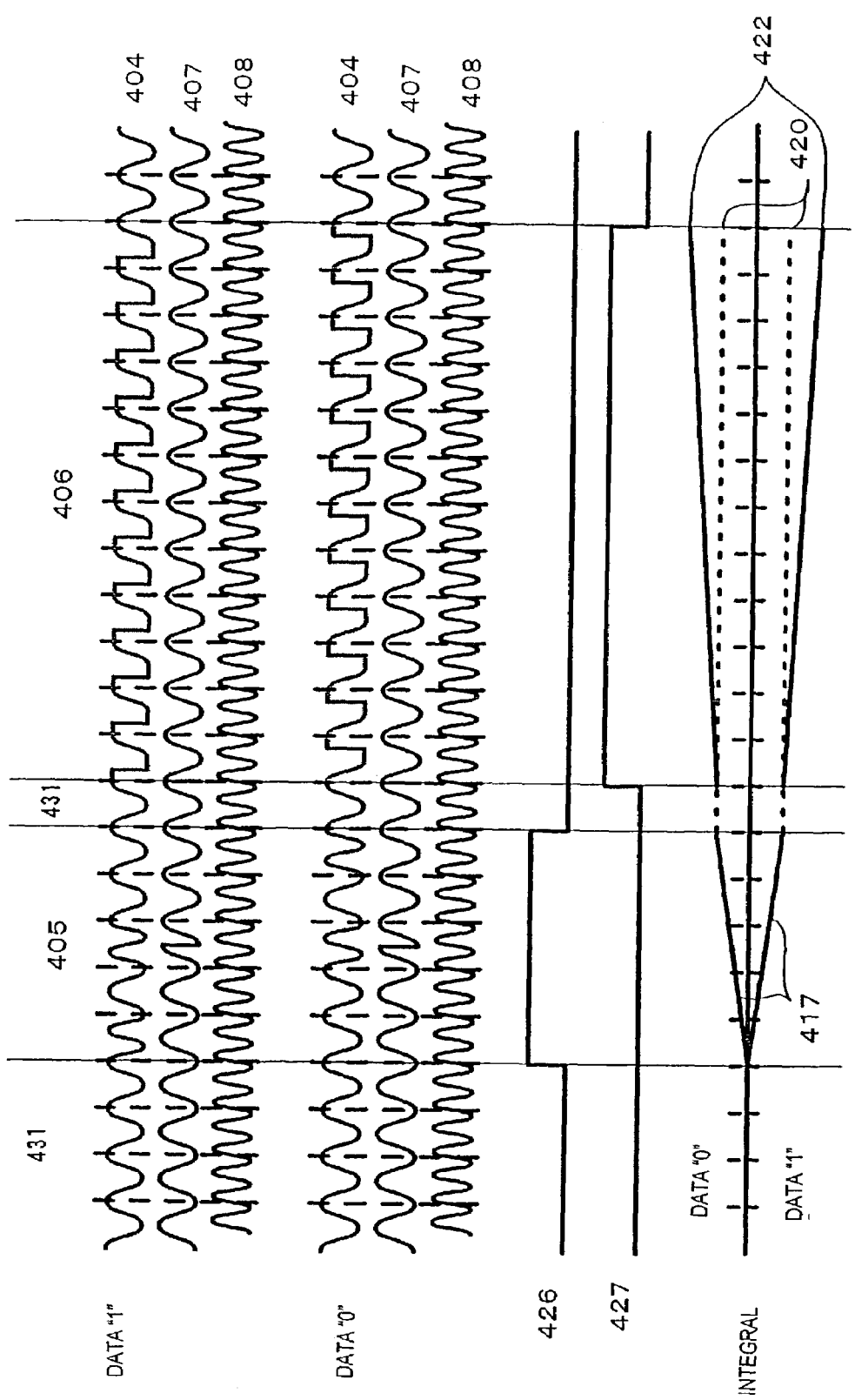
FIGS. 5, 6 and 7 show waveforms of signals at respective components of the address information reader shown in FIG. 4.
Figure 6:
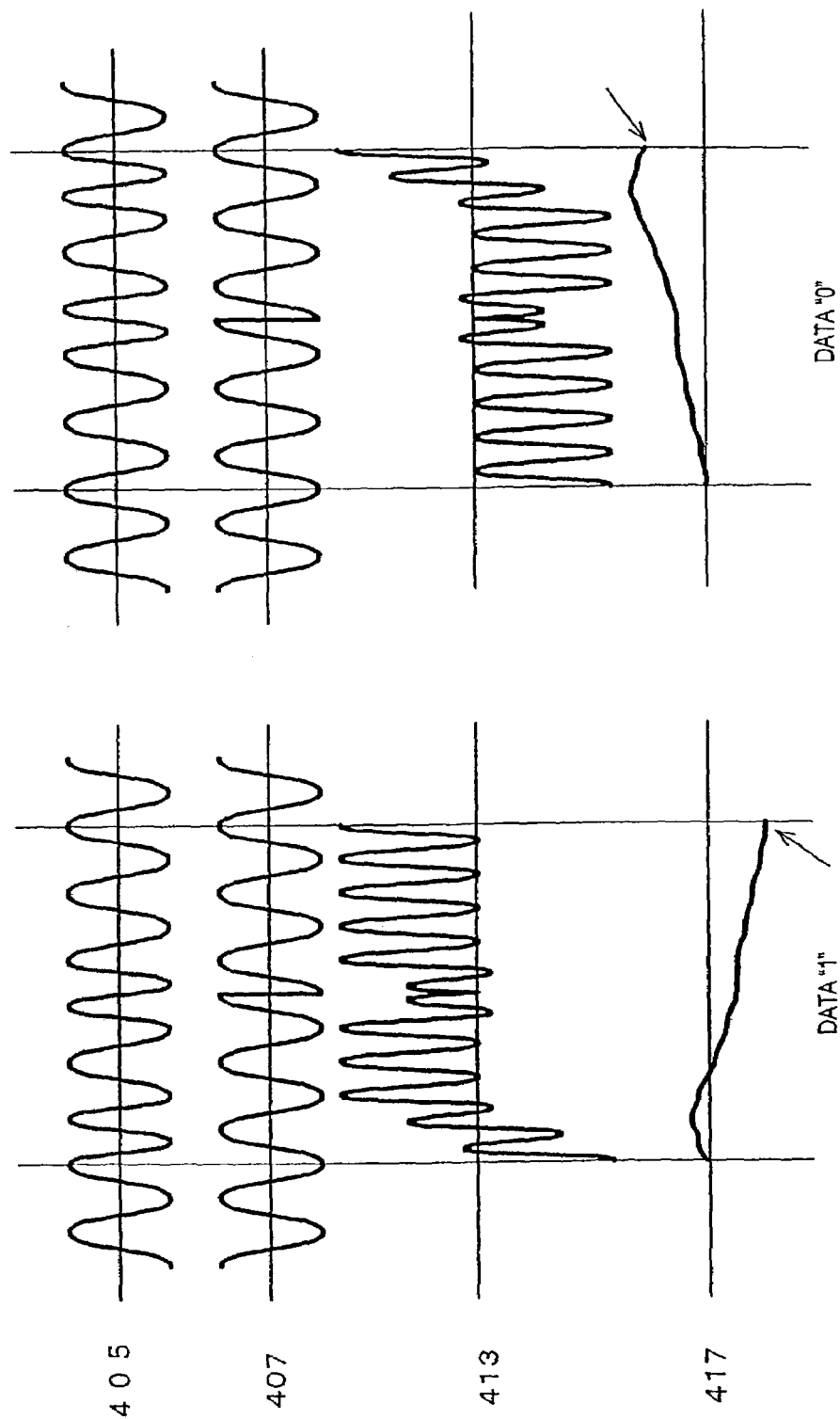
Figure 7:
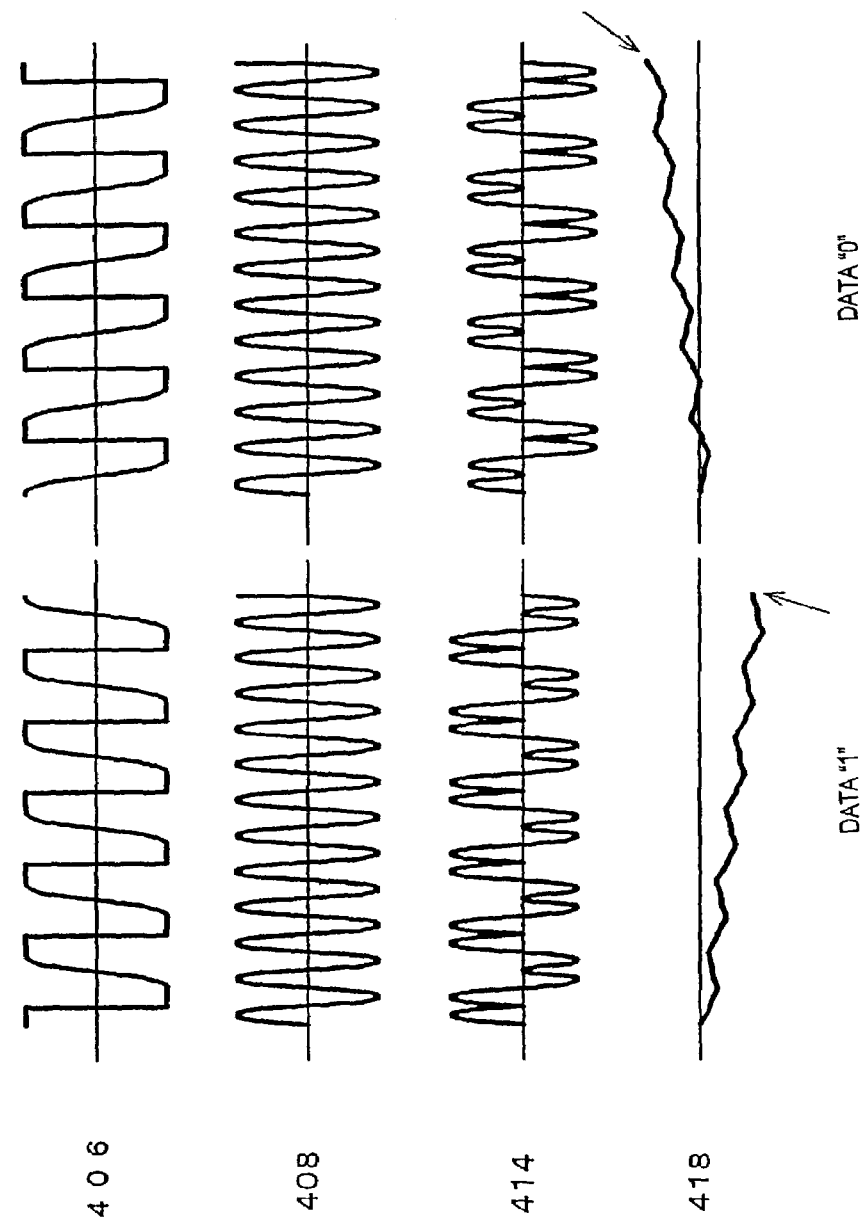

FIG. 4 is a block diagram showing a configuration for an address information reader 11 according to the first preferred embodiment. FIGS. 5, 6 and 7 show the waveforms of signals to be obtained at respective components of the address information reader 11. As shown in FIG. 4, the address information reader 11 includes detectors 401 and 402, which are spaced apart from each other in a radial direction of the disc, and a differential amplifier 403. A laser beam is focused onto, and reflected from, a particular portion of the groove on the optical disc. The reflected laser beam forms a beam spot 400 over the two detectors 401 and 402. Then, the output signals of these two detectors 401 and 402 are supplied to the differential amplifier 403, which calculates the difference between these two signals, thereby obtaining an address read signal 404 representing the wobble shape. As shown in FIG. 5, the address read signal 404 includes a first address signal 405 and a second address signal 406, which are obtained from the first and second regions 300 and 301 of the groove on the optical disc. Two address read signals 404 are shown in FIG. 5. In the upper address read signal 404, the first and second address signals 405 and 406 represent data "1". In the lower address read signal 404 on the other hand, the first and second address signals 405 and 406 represent data "0". As also shown in FIG. 5, the address read signal 404 further includes a sine wave address signal 431 to be obtained from the sine wave wobbled region 302 of the groove on the optical disc. The first and second address signals 405 and 406 of the address read signal 404 have signal waveforms representing the wobble shapes of the groove on the optical disc. More specifically, the first address signal 405 has a signal waveform that includes a plurality of sine wave portions and at least one sine wave portion with an inverted phase. On the other hand, the second address signal 406 has a signal waveform that rises either steeply or gently with respect to the tracking direction.

As shown in FIG. 4, the address information reader 11 includes a first multiplier 409, a first signal generator 411, a second multiplier 410, a second signal generator 412, a first integrator circuit 415 and a second integrator circuit 416.

The first multiplier 409 and the second multiplier 410 are connected to the differential amplifier 403 in parallel, and the address read signal 404 including the first address signal 405, the second address signal 406 and the sine wave address signal 431 is simultaneously output to the first multiplier 409 and the second multiplier 410. Thus, the first multiplier 409 and the second multiplier 410 receive the first address signal 405, the second address signal 406 and the sine wave address signal 431, and operate based on them. However, as will be explained in detail hereinafter, the first integrator circuit 415, the second integrator circuit 416 respectively receiving the output from the first multiplier 409 and the second multiplier 410 are controlled so as to operate the integration only during the time the first address signal 405 and the second address signal 406 are output. In other words, no operations of the first multiplier 409 and the second multiplier 410 which do not relate to the first address signal 405 and the second address signal 406, respectively, affect reading the address information. For this reason, only the case where the first multiplier 409 and the second multiplier 410 deal with the first address signal 405 and the second address signal 406, respectively will be explained hereinafter.

The first multiplier 409 multiplies together the first address signal 405 and the output signal 407 of the first signal generator 411 to obtain an output signal 413. As shown in FIGS. 5 and 6, the output signal 407 of the first signal generator 411 is a reference signal, which is phase-locked to the sine wave address signal 431, has a phase that is either inverted or non-inverted to that of the address signal 431 and has the same frequency as the address signal 431. The phase of the output signal 407 during the first half of the output period of the first address signal 405 is inverted to that of the output signal 407 during the second half of the output period of the first address signal 405.

The output signal 413 of the first multiplier 409 is integrated by the first integrator circuit 415, which outputs a first integral 417 as a result. A first gate generator 428 is provided to control the ON/OFF states of the switch 424 of the first integrator circuit 415 such that the first integrator circuit 415 integrates only the output signal 413 corresponding to the first address signal 405. As shown in FIG. 5, while the first address signal 405 is being output, the first gate generator 428 outputs the control signal 426, thereby turning the switch 424 OFF and making the first integrator circuit 415 integrate the output signal 413. On the other hand, while the first address signal 405 is not output, no control signal 426 is output, either, and the switch 424 is turned ON. Accordingly, while the first address signal 405 is not output, the first integrator circuit 415 is reset and the integral becomes zero. By performing such an operation, the first integrator circuit 415 outputs the first integral 417 shown in FIGS. 5 and 6.

As shown in FIGS. 5 and 6, if the first address signal 405 represents data "0", the first integral 417 has a positive value. On the other hand, if the first address signal 405 represents data "1", the first integral 417 has a negative value.

The second multiplier 410 and the second integrator circuit 416 perform similar arithmetic operations on the second address signal 406. Specifically, the second multiplier 410 multiplies together the second address signal 406 and the output signal 408 of the second signal generator 412 to obtain an output signal 414. As shown in FIGS. 5 and 7, the output signal 408 of the second signal generator 412 has a frequency that is twice as high as the sine wave address signal 431 and is phase-locked to the address signal 431 so as to have their zero-crossings matched together. It is to be noted that the output signal 414 has a frequency that is twice as high as that of the address signal 431. However, the output signal 414 may have a frequency that is other even number of times as high as that of the address signal 431. This can be applied for the following embodiments.

The output signal 414 of the second multiplier 410 is integrated by the second integrator circuit 416, which outputs a second integral 418 as a result. A second gate generator 429 is provided to control the ON/OFF states of the switch 425 of the second integrator circuit 416 such that the second integrator circuit 416 integrates only the output signal 414 corresponding to the second address signal 406. As shown in FIG. 5, while the second address signal 406 is being output, the second gate generator 429 outputs the control signal 427, thereby turning the switch 425 OFF and making the second integrator circuit 416 integrate the output signal 414'. On the other hand, while the second address signal 406 is not output, no control signal 427 is output, either, and the switch 425 is turned ON. Accordingly, while the second address signal 406 is not output, the second integrator circuit 416 is reset and the integral becomes zero. By performing such an operation, the second integrator circuit 416 outputs the signal 418 shown in FIGS. 5 and 7.

As shown in FIG. 7, if the second address signal 406 represents data "0", the output signal 418 has a positive value. On the other hand, if the second address signal 406 represents data "1", the output signal 418 has a negative value.

As shown in FIG. 4, the first integral 417 of the first integrator circuit 415 is sampled and held by a sample-and-hold circuit 419. The sample-and-hold circuit 419 hold the first integral 417 until the second integral 418 is output. The output signal 420 of the sample-and-hold circuit 419 and the second integral 418 of the second integrator circuit 416 are added together by an adder 421, thereby generating a sum signal 422. In this manner, the first integral 417 corresponding to the first address signal 405 and the second integral 418 corresponding to the second address signal 406 are added together. The address information reader 11 further includes an address decision circuit 423 to read the address information by determining whether the sum signal 422 represents data "0" or data "1" at the end of the second address signal 406. In this manner, the address information represented by the wobble shapes of the groove can be acquired.

In the preferred embodiment described above, the wobbled groove of the optical disc includes the first region 300 having a plurality of sine wave portions, at least one of which has an inverted phase, and the second region 301 having wobbled portions with steep inward or outward displacements, and the same address information is recorded on the first and second regions 300 and 301. To read the address information from such an optical disc, the first and second address signals 405 and 406, corresponding to the first and second regions 300 and 301, respectively, are subjected to separate integration processes, thereby obtaining the first and second integrals 417 and 418. Then, the first and second integrals 417 and 418 are added together to obtain a signal for use to determine the address information as zero or one. When the first and second integrals 417 and 418 are added together, the signal component increases by 6 dB but the noise component increases just by 3 dB. Thus, the signal to noise ratio can be increased by 3 dB and the ability to read the address accurately can be improved. Also, the absolute values of the first integral 417 obtained by integrating the first address signal 405 and the second integral 418 obtained by integrating the second address signal 406 may be made small by the affection of various stresses, which causes detection errors of the address information. However, if the address information is obtained from the sum of the first and second integrals 417 and 418, more likely address information can be obtained.

In the preferred embodiment described above, the first region 300 of the optical disc has a wobble shape including a plurality of sine wave portions, at least one of which has an inverted phase, and the second region 301 thereof has a wobble shape including steep inward or outward displacements. Alternatively, the wobble shapes of the first and second regions 300 and 301 may be interchanged with each other. In that case, the sample-and-hold circuit 419 is preferably provided to receive the second integral 418 of the second integrator circuit 416. Then, the integrals of the address signals, corresponding to the two regions of the optical disc, can be added together appropriately. Also, the correspondence between one combination of wobble shapes of the first and second regions 300 and 301 and data "1" and the correspondence between the other combination of wobble shapes of the first and second regions 300 and 301 and data "0" may also be interchanged with each other.

Embodiment 2

Figure 8:
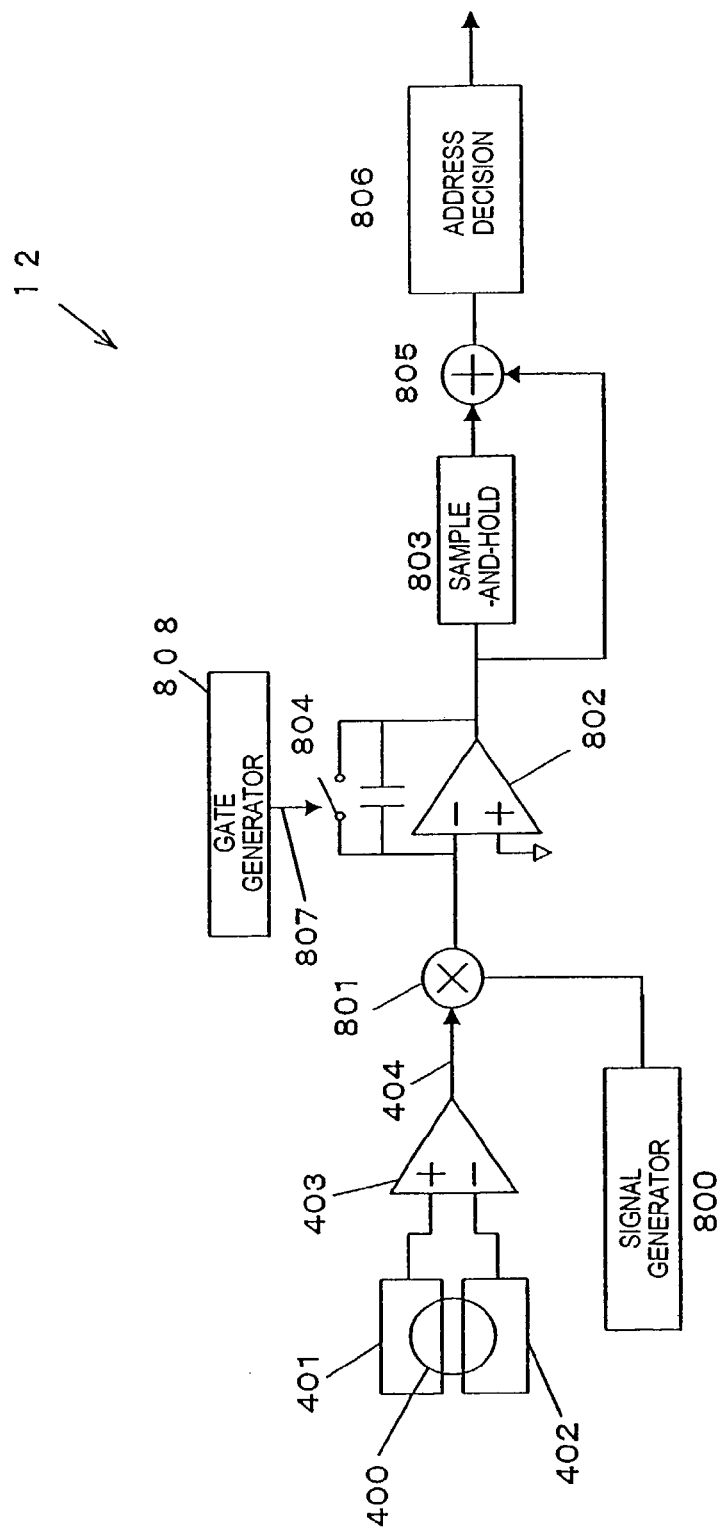
FIG. 8 is a block diagram showing a configuration for an address information reader according to a second specific preferred embodiment of the present invention.

Hereinafter, a method and apparatus for reading out address information according to a second specific preferred embodiment of the present invention will be described. FIG. 8 is a block diagram showing a configuration for an address information reader 12 according to the second preferred embodiment. As shown in FIG. 8, the address information reader 12 includes a multiplier 801 and an integrator circuit 802 that can be used in common for both the first and second address signals 405 and 406. In FIG. 8, each of the components of the address information reader 12, having substantially the same function as the counterpart of the address information reader 11 of the first preferred embodiment described above, is identified by the same reference numeral.

Figure 9:
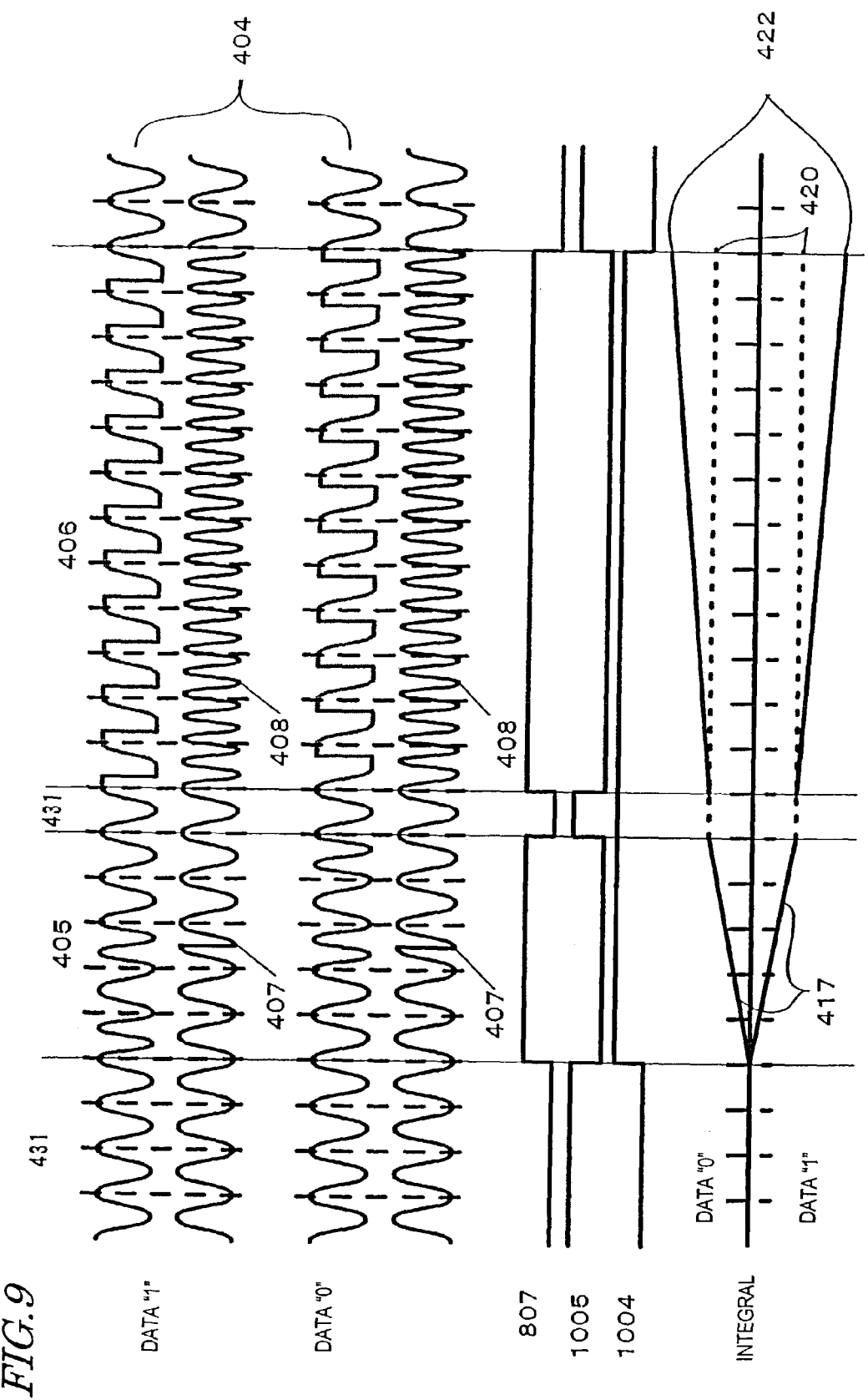
FIG. 9 shows waveforms of signals at respective components of the address information reader shown in FIG. 8.

As shown in FIG. 8, the address information reader 12 includes a signal generator 800, a multiplier 801, an integrator circuit 802, a sample-and-hold circuit 803, an adder 805 and an address decision circuit 806. FIG. 9 shows the waveforms of signals at respective components of this address information reader 12.

As in the first preferred embodiment described above, the address read signal 404 representing the wobbled groove is obtained by the detectors 401 and 402, which are spaced apart from each other in the radial direction, and the differential amplifier 403. The address read signal 404 also includes the first and second address signals 405 and 406 as shown in FIG. 5.

Also, as in the first preferred embodiment, while the first address signal 405 is being output from the differential amplifier 403, the signal generator 800 outputs a reference signal 407, which is phase-locked to the sine wave address signal 431, has a phase that is either non-inverted or inverted to that of the address signal 431 and has the same frequency as the address signal 431. This reference signal 407 and the first address signal 405 are multiplied together by the multiplier 801 and the product is input to the integrator circuit 802. In response to a control signal 807 output from a gate generator 808 (see FIG. 9), the integrator circuit 802 performs the integration operation while the first address signal 405 is being output. Then, the first integral 417 is sampled and held by the sample-and-hold circuit 803.

Next, when the second address signal 406 is output from the differential amplifier 403, the signal generator 800 outputs another reference signal 408, which has a frequency twice as high as that of the sine wave address signal 431 and which is phase-locked to the address signal 431. This reference signal 408 and the second address signal 406 are multiplied together by the multiplier 801 and the product is input to the integrator circuit 802. In response to the control signal 807 output from the gate generator 808 (see FIG. 9), the integrator circuit 802 performs the integration operation while the second address signal 406 is being output. Then, the integrator circuit 802 outputs the second integral 418 to the adder 405, not to the sample-and-hold circuit 803.

At the same time, the first integral 417 is also output from the sample-and-hold circuit 803 to the adder 805. Thus, the first and second integrals 417 and 418 are added together by the adder 805. As a result, the sum signal 422 is obtained. Then, the address decision circuit 806 determines whether the sum signal 422 represents data "0" or data "1". Based on the decision result, the address decision circuit 806 generates address information.

As shown in FIG. 9, while neither the first address signal 405 nor the second address signal 406 is being output, the gate generator 808 deactivates the control signal 807 to turn the switch 804 ON. As a result, the output of the integrator circuit 802 is reset.

As described above, just one multiplier 801 and just one integrator circuit 802 are needed in this preferred embodiment. Thus, the address information reader 12 can have a simplified configuration.

Figure 10:
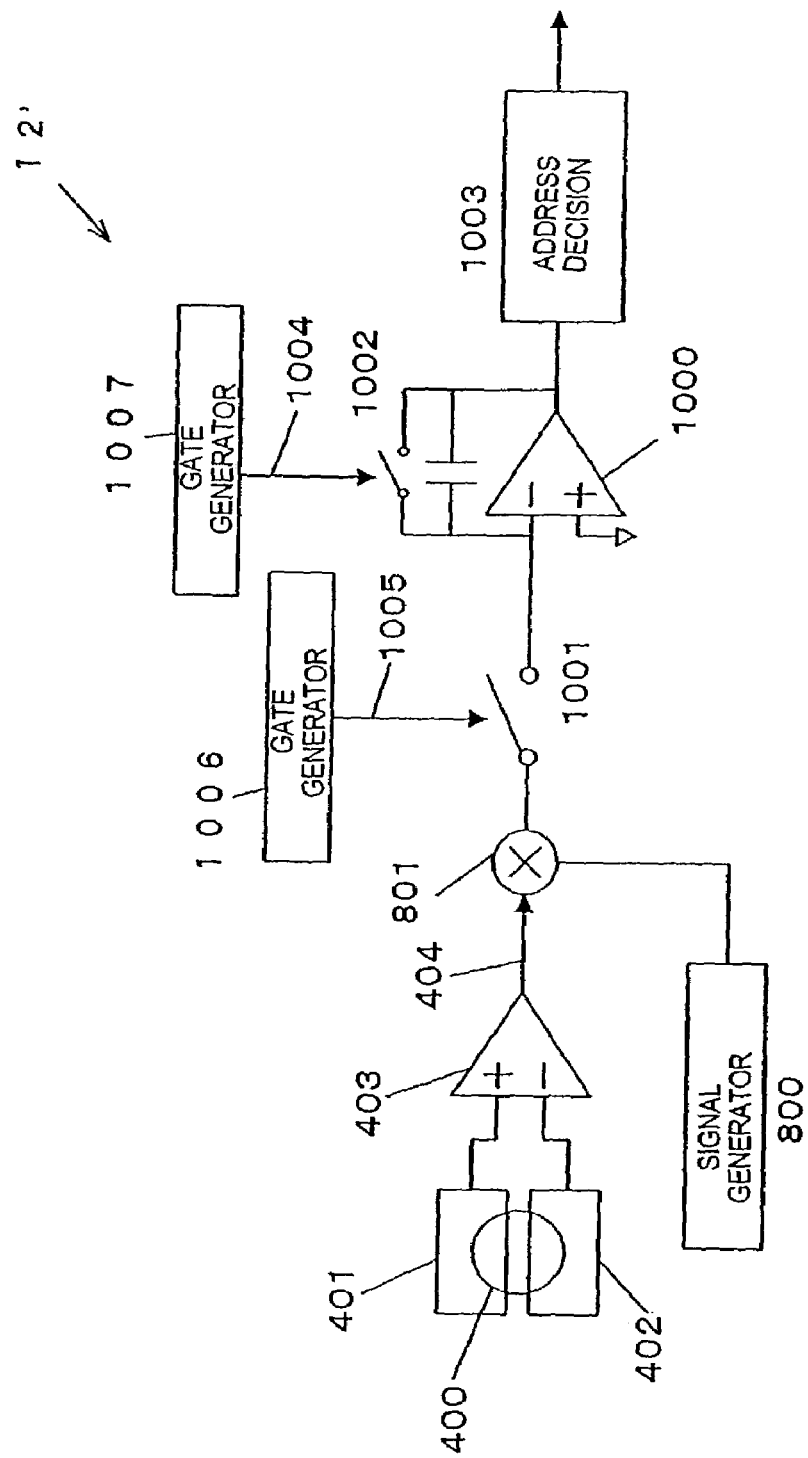
FIG. 10 is a block diagram showing a configuration for an address information reader according to a modified example of the second preferred embodiment.

FIG. 10 is a block diagram showing a configuration for an address information reader 12' according to a modified example of the second preferred embodiment.

As shown in FIG. 10, the address information reader 12' includes the signal generator 800, the multiplier 801, a sample-and-hold switch 1001, an integrator circuit 1000 and an address decision circuit 1003.

As in the first preferred embodiment, while the first address signal 405 is being output from the differential amplifier 403, the signal generator 800 outputs a reference signal 407, which is phase-locked to the sine wave address signal 431, has a phase that is either non-inverted or inverted to that of the address signal 431 and has the same frequency as the address signal 431. This reference signal 407 and the first address signal 405 are multiplied together by the multiplier 801 and the product is input to the integrator circuit 1000 by way of the sample-and-hold switch 1001. The integrator circuit 1000 integrates the multiplied signal. In response to a control signal 1004 supplied from a gate generator 1007, the switch 1002 of the integrator circuit 1000 is selectively turned ON or OFF. As shown in FIG. 9, the control signal 1004 is output from the gate generator 1007 such that the integrator circuit 1000 continuously performs the integration operation after the first address signal 405 started to be output and until the second address signal 406 finishes being output.

In the interval after the first address signal 405 finished being output and before the second address signal 406 starts to be output, the sample-and-hold switch 1001 is turned OFF in response to the control signal 1005 to be output from the gate generator 1006. In that case, even if the sine wave address signal is input to the multiplier 801, the product is not input to the integrator circuit 1000. Also, although the integrator circuit 1000 is still performing the integration operation in response to the control signal 1004, no signal is newly input to the integrator circuit 1000 since the sample-and-hold switch 1001 is open. Accordingly, the integrator circuit 1000 holds the first integral 417 in the meantime.

Next, when the second address signal 406 is output from the differential amplifier 403, the signal generator 800 outputs another reference signal 408, which has a frequency twice as high as that of the sine wave address signal 431 and which is phase-locked to the address signal 431. This reference signal 408 and the second address signal 406 are multiplied together by the multiplier 801 and the product is input to the integrator circuit 1000 by way of the sample-and-hold switch 1001. The integrator circuit 1000 integrates the multiplied signal corresponding to the second address signal 406. At this point in time, the first integral 417 corresponding to the first address signal 405 is held in the integrator circuit 1000. Thus, the integrator circuit 1000 adds the first integral 417 to a second integral corresponding to the second address signal 406. Accordingly, the output of the integrator circuit 1000 is the sum of the first integral 417 corresponding to the first address signal 405 and the second integral 418 corresponding to the second address signal 406.

When the second address signal 406 falls, the address decision circuit 1003 determines whether the output of the integrator circuit 1000 is data "0" or data "1". Based on the result of the decision, the address decision circuit 1003 generates the address information.

Thereafter, the control signal 1004 falls and the switch 1002 is closed as shown in FIG. 9. As a result, the integrator circuit 1000 is reset.

Embodiment 3

Hereinafter, a method and apparatus for reading out address information according to a third specific preferred embodiment of the present invention will be described. In this third preferred embodiment, the address read signal is converted into desired digital signals, which are subjected to the multiplication and integration processes. Then, the resultant integrals are added together, thereby detecting the address information.

Figure 11:
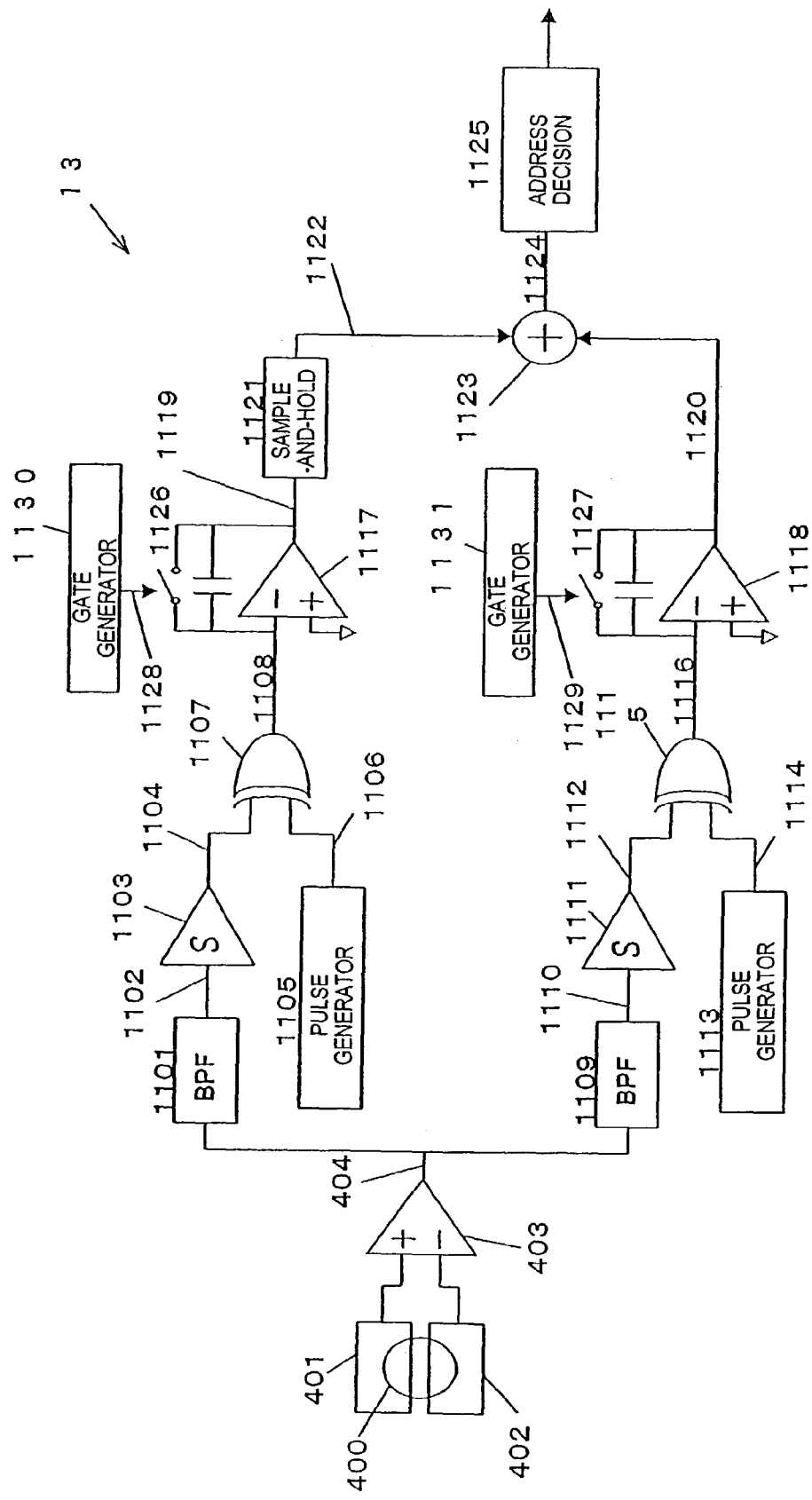
FIG. 11 is a block diagram showing a configuration for an address information reader according to a third specific preferred embodiment of the present invention.
Figure 12:
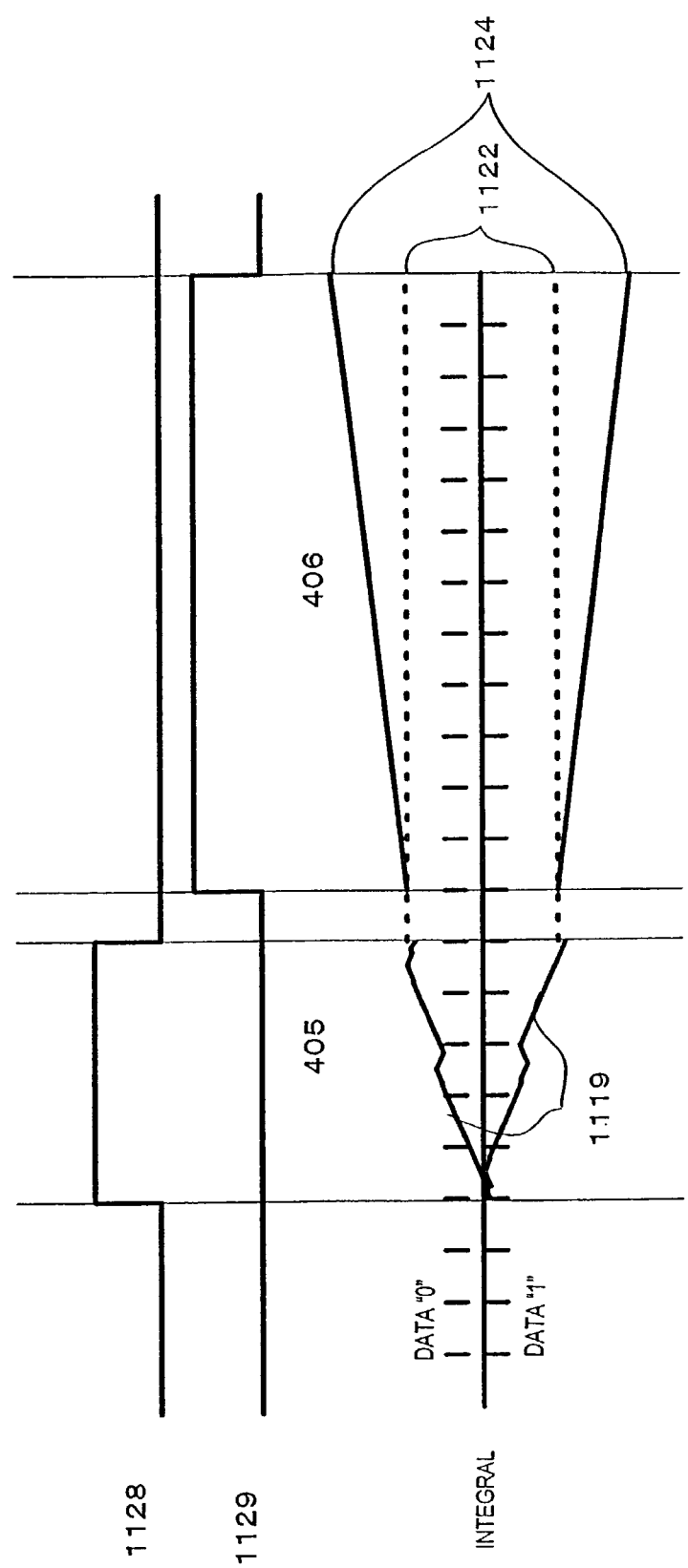
FIGS. 12, 13 and 14 show waveforms of signals at respective components of the address information reader shown in FIG. 11.
Figure 13:
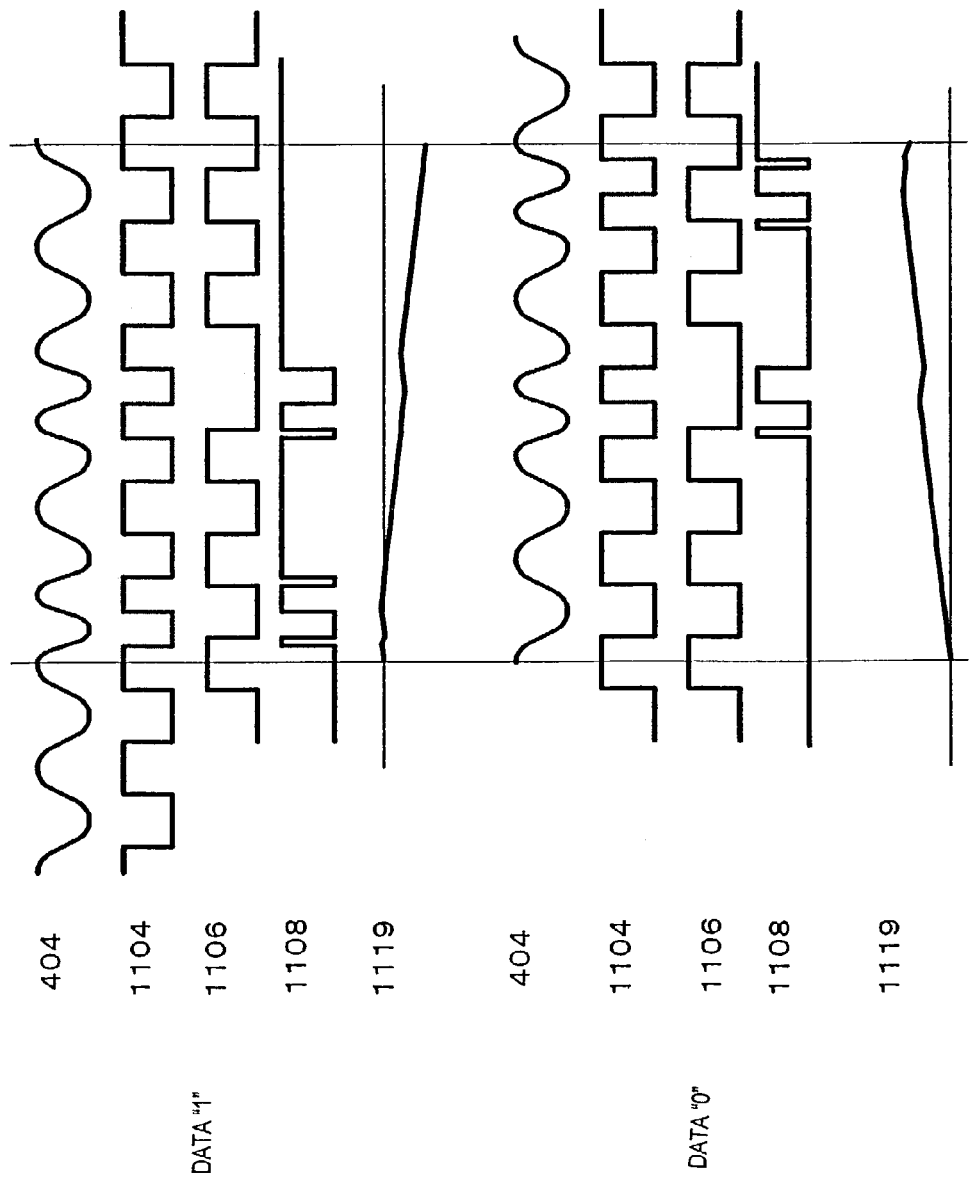
Figure 14:
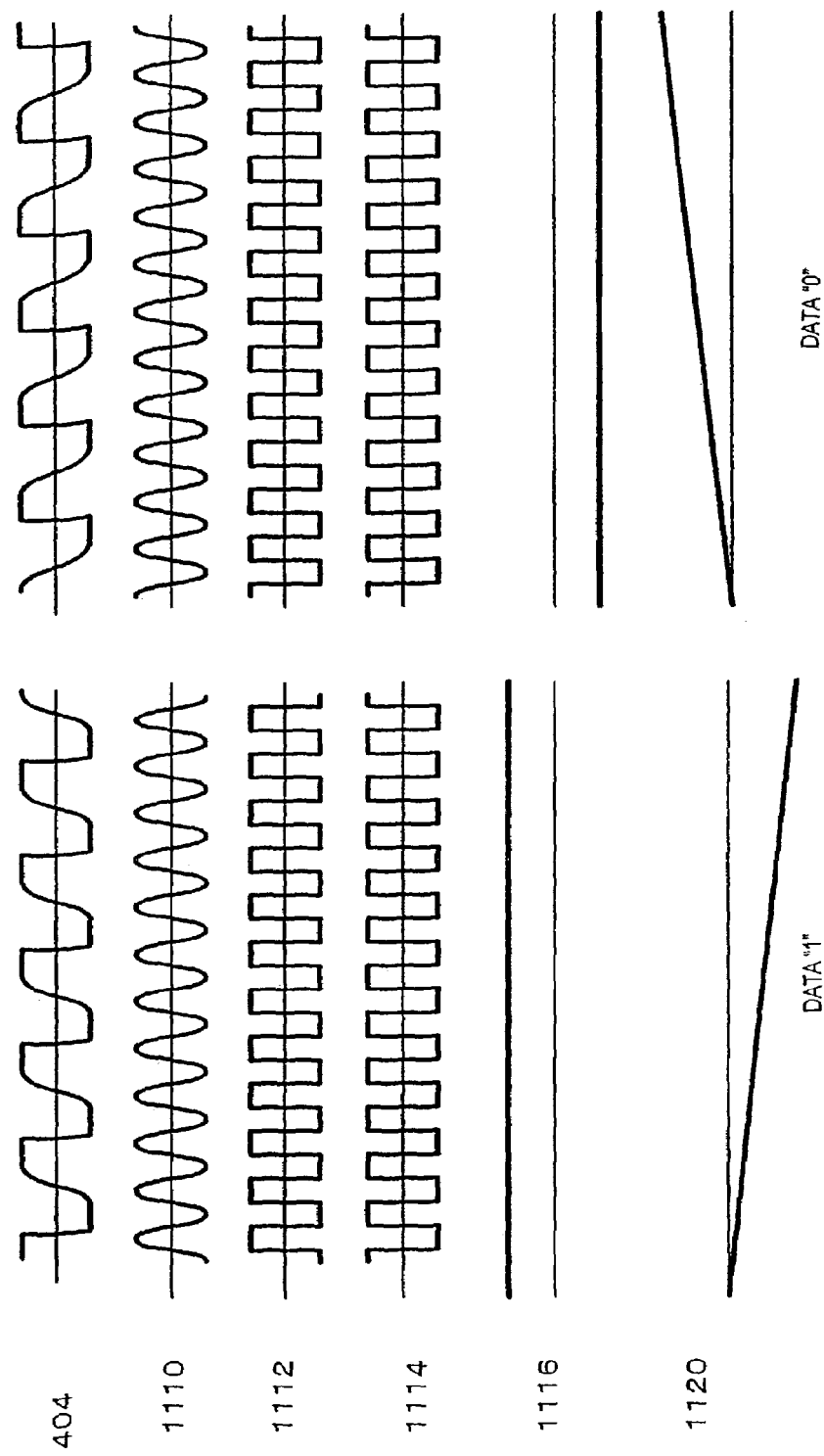

FIG. 11 is a block diagram showing a configuration for an address information reader 13 according to the third preferred embodiment. FIGS. 12, 13 and 14 show the waveforms of signals at respective components of the address information reader 13.

In the address information reader 13, the first address signal 405 passes a first band-pass filter (BPF) 1101 and has its bandwidth limited by the first BPF 1101. The resultant address read signal 1102 with the limited bandwidth is input to a comparator 1103. In response, the comparator 1103 generates a digital signal 1104 from the bandwidth-limited address read signal 1102 and then outputs the digital signal 1104 to an exclusive OR (EX-OR) gate 1107.

As shown in FIG. 13, a first pulse generator 1105 generates a digital pulse signal 1106 as a reference signal, which is phase-locked to the sine wave address signal 431, has a phase that is either non-inverted or inverted to that of the address signal 431 and has the same frequency as the address signal 431. The phase of the digital pulse signal 1106 during the first half of the period in which the first address signal 405 is output is inverted to the phase thereof during the second half of that period.

The digital signal 1104 and the digital pulse signal 1106 are input to the exclusive OR gate 1107. In a binary operation, the exclusive OR gate 1107 functions as a multiplier. The output signal 1108 of the exclusive OR gate 1107 is integrated by a first integrator circuit 1117, which outputs a first integral 1119 as a result. A first gate generator 1130 is provided to control the ON/OFF states of the switch 1126 of the first integrator circuit 1117 such that the first integrator circuit 1117 integrates only the output signal 1108 corresponding to the first address signal 405. As shown in FIG. 12, while the first address signal 405 is being output, the first gate generator 1130 outputs the control signal 1128, thereby turning the switch 1126 OFF and making the first integrator circuit 1117 integrate the output signal 1108. On the other hand, while the first address signal 405 is not output, no control signal 1128 is output, either, and the switch 1126 is turned ON. Accordingly, while the first address signal 405 is not output, the first integrator circuit 1117 is reset and the integral becomes zero. By performing such an operation, the first integrator circuit 1117 outputs the signal 1119 shown in FIGS. 12 and 13.

As shown in FIGS. 12 and 13, if the first address signal 405 represents data "0", the output signal 1119 has a positive value. On the other hand, if the first address signal 405 represents data "1", the output signal 1119 has a negative value.

A second exclusive OR gate 1115 and a second integrator circuit 1118 perform similar operations on the second address signal 406. Specifically, the second address signal 406 is passed through a second band-pass filter (BPF) 1109, thereby generating a second harmonic signal 1110, which is input to a comparator 1111. The output digital signal 1112 of the comparator 1111 is input to the exclusive OR gate 1115. The exclusive OR gate 115 performs an exclusive OR operation on the digital signal 1112 and the output signal 1114 of a second pulse generator 1113, thereby obtaining an output signal 1116. As shown in FIGS. 12 and 14, the output signal 1114 of the second pulse generator 1113 is a digital reference signal, which has a frequency twice as high as that of the sine wave address signal 431 and which is phase-locked to the address signal 431.

The output signal 1116 of the exclusive OR gate 1115 is integrated by a second integrator circuit 1118, which outputs a second integral 1120 as a result. A second gate generator 1131 is provided to control the ON/OFF states of the switch 1127 of the second integrator circuit 1118 such that the second integrator circuit 1118 integrates only the output signal 1116 corresponding to the second address signal 406. As shown in FIG. 12, while the second address signal 406 is being output, the second gate generator 1131 outputs the control signal 1129, thereby turning the switch 1127 OFF and making the second integrator circuit 1118 integrate the output signal 1116. On the other hand, while the second address signal 406 is not output, no control signal 1129 is output, either, and the switch 1127 is turned ON. Accordingly, while the second address signal 406 is not output, the second integrator circuit 1118 is reset and the integral becomes zero. By performing such an operation, the second integrator circuit 1118 outputs the signal 1120 shown in FIG. 14.

As shown in FIG. 14, if the second address signal 406 represents data "0", the output signal 1120 has a positive value. On the other hand, if the second address signal 406 represents data "1", the output signal 1120 has a negative value.

As shown in FIG. 11, the output signal 1119 of the first integrator circuit 1117 is sampled and held by a sample-and-hold circuit 1121. The output signal 1122 of the sample-and-hold circuit 1121 and the output signal 1120 of the second integrator circuit 1118 are added together by an adder 1123, thereby generating a sum signal 1124. In this manner, the integral 1119 corresponding to the first address signals 405 and the integral 1120 corresponding to the second address signal 406 are added together. The address information reader 13 further includes an address decision circuit 1125 to read the address information by determining whether the sum signal 1124 represents data "0" or data "1" at the end of the second address signal 406. In this manner, the address information represented by the wobble shapes of the groove can be acquired.

In the preferred embodiment described above, the first and second address signals are subjected to the integration and detection processes after having been digitized by the respective comparators. Accordingly, even if the first and second address signals have variable amplitudes, the integration processes on the first and second address signals can still be carried out constantly. In addition, the exclusive OR gates can be used as multipliers, and the address information reader can have a simplified circuit configuration.

In the preferred embodiment described above, the first and second integrator circuits 1117 and 1118 are implemented as analog circuits. Alternatively, the first and second integrator circuits 1117 and 1118 may also be implemented as digital circuits. A second harmonic component is detected from the second address signal but a harmonic component of a higher order may be detected from the second address signal. Furthermore, in the preferred embodiment described above, the first and second integrals 1119 and 1120 are added together as they are. Optionally, at least one of these integrals 1119 and 1120 may be weighted by a weighting circuit before these integrals 1119 and 1120 are added together.

Embodiment 4

In the first through third preferred embodiments described above, the first and second address signals are processed so as to be added together and the address information is obtained based on the sum thereof. In contrast, in the following preferred embodiments, it is determined which of the two address signals will provide the more reliable address information, and the address information is acquired by using the address signal selected.

Specifically, in a fourth specific preferred embodiment of the present invention, the eye aperture values of address detection signals to be obtained from the first and second address signals are estimated, and one of the first and second address signals is selected based on the eye aperture values.

First, the address detection signals and their eye aperture values will be described with reference to FIGS. 6 and 7.

As indicated by the arrows in FIG. 6, an address detection signal is obtained by detecting the value of the first integral 417, corresponding to the first address signal 405, when the first address signal 405 finishes being output. As indicated by the arrows shown in FIG. 7, another address detection signal is obtained by detecting the value of the second integral 418, corresponding to the second address signal 406, when the second address signal 406 finishes being output. Actually, though, noise will enter an address detector extraneously. For that reason, the reliability of the address information detected is changeable with the absolute value of the address detection signal. Generally speaking, the greater the absolute value of the address detection signal, the more reliable the address information obtained. A pattern defined by two waveforms of a read signal, representing the data "0" and data "1", respectively, is normally termed an "eye pattern", and a difference in amplitude between these two waveforms representing the data "0" and data "1" is normally called an "eye aperture". In this preferred embodiment, however, the absolute value of each address detection signal representing the data "0" or "1" will be referred to as an "eye aperture value".

By estimating the eye aperture values of the address detection signals by some method or other, the reliability of the address information to be obtained from the first address signal 405 may be compared to that of the address information to be obtained from the second address signal 406 based on their eye aperture values, and one of the address signals 405 and 406 that resulted in the greater eye aperture value (i.e., the higher reliability) can be selected. Then, the more reliable address information can be obtained. In this case, the eye aperture values of the address detection signals may be estimated bit by bit of the address information such that one of the address signals may be selected on a bit-by-bit basis. Alternatively, one of the address signals that should provide the more reliable address information may be selected for each predetermined region (e.g., an address block made up of a predetermined number of address information bits) by some statistical method (e.g., by comparing the averages of eye aperture values, the averages of squared eye aperture values, or the minimum eye aperture values to each other). As another alternative, the address signal to be selected next time may also be determined based on the statistics of past eye aperture values.

Hereinafter, it will be briefly described exactly in what situation the address information read out from the first region 300 of the wobbled groove on the optical disc shown in FIG. 3 would have a different eye aperture value from the address information read out from the second region 301 thereof.

First, suppose a minor defect has occurred due to the deposition of dust particles on the surface of an optical disc. The first address signal 405 read out from the first region 300 has a phase-inverted portion with short duration and the first region 300 itself is also short. Accordingly, if the dust particles happen to be deposited on the first region 300, then the scanning laser beam is blocked by the dust particles. As a result, the eye aperture value of the address detection signal that has been obtained from the first region 300 decreases significantly. In the second region 301 on the other hand, the address information is stored dispersively over a long range. For that reason, even if such dust particles are deposited anywhere in the second region 301, the address detection signal is affected by those particles only slightly. Thus, the eye aperture value does not decrease so much.

In contrast, in a situation where a fingerprint has been left on the data recording side of an optical disc, for example, the laser beam would be lightly interrupted over a wide range. In that case, the second region 301 would be affected more seriously by such a defect due to the dispersion of the address information, and the address detection signal obtained from the second region 301 should have a decreased eye aperture value.

It should be noted that the address detection signal is preferably normalized by an integrator circuit with gain by reference to a value corresponding to an ideal input signal.

Figure 15:
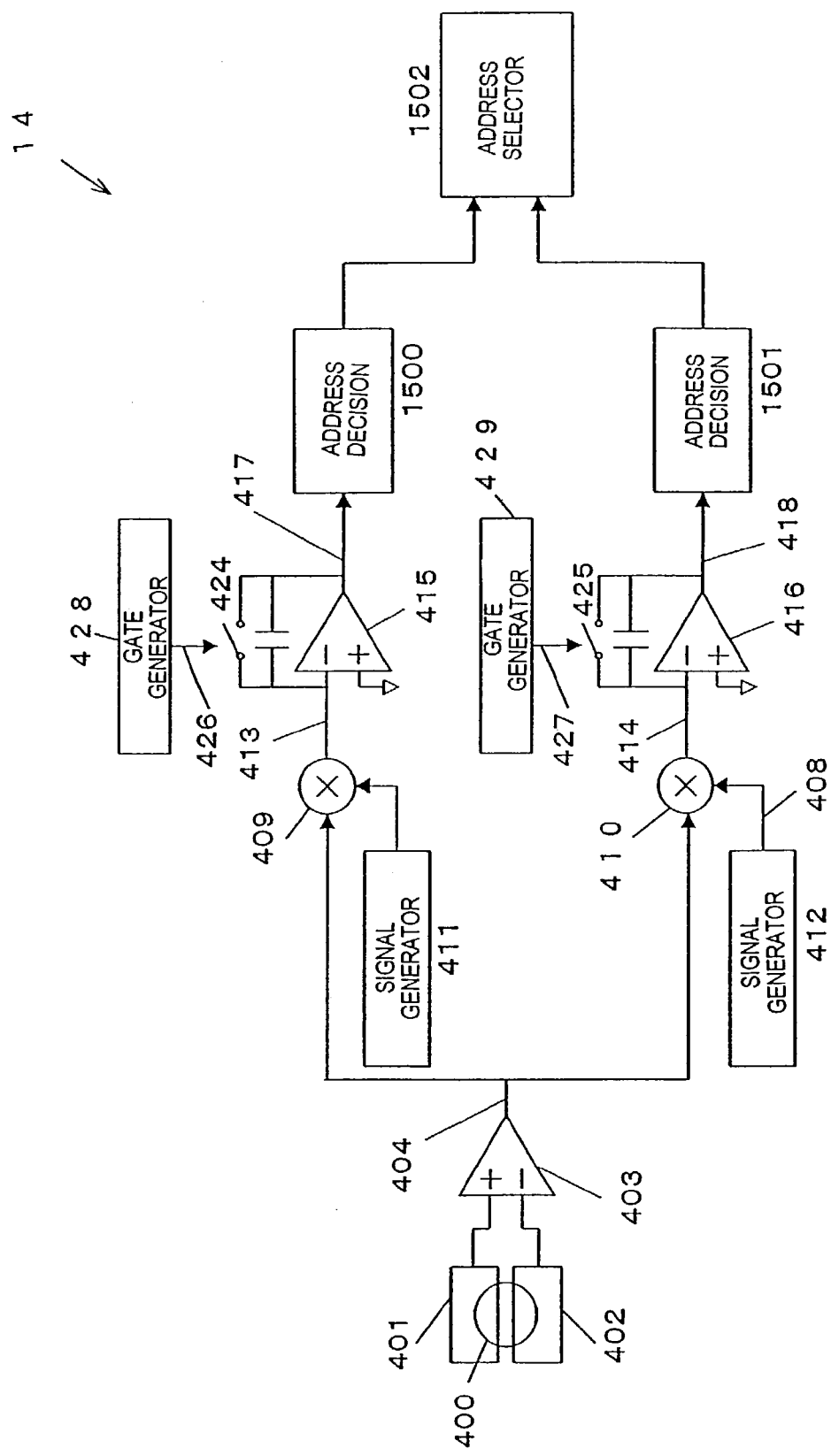
FIG. 15 is a block diagram showing a configuration for an address information reader according to a fourth specific preferred embodiment of the present invention.

Hereinafter, an address information reader 14 according to the fourth preferred embodiment will be described with reference to FIG. 15. FIG. 15 is a block diagram showing a configuration for the address information reader 14. In FIG. 15, each of the components of the address information reader 14, having substantially the same function as the counterpart of the address information reader 11 of the first preferred embodiment described above, is identified by the same reference numeral. As in the first preferred embodiment described above, the first integrator circuit 415 outputs the first integral 417 corresponding to the first address signal 405. On receiving the first integral 417, a first address decision circuit 1500 detects, as the first address detection signal, the value of the first integral 417 at a point in time when the first address signal 405 finishes being output (i.e., at the end of the integration period). Based on the polarity of the first address detection signal, the first address decision circuit 1500 obtains first address information, or determines whether the address detection signal represents data "0" or data "1". Then, the first address decision circuit 1500 outputs the first address information to an address selector 1502. The first address decision circuit 1500 also outputs the absolute value of the first address detection signal as a first eye aperture value to the address selector 1502.

In the same way, the second integrator circuit 416 also outputs the second integral 418 corresponding to the second address signal 406. On receiving the second integral 418, a second address decision circuit 1501 detects, as the second address detection signal, the value of the second integral 418 at a point in time when the second address signal 406 finishes being output (i.e., at the end of the integration period). Based on the polarity of the second address detection signal, the second address decision circuit 1501 obtains second address information, or determines whether the address detection signal represents data "0" or data "1". Then, the second address decision circuit 1501 outputs the second address information to the address selector 1502. The second address decision circuit 1501 also outputs the absolute value of the second address detection signal as a second eye aperture value to the address selector 1502.

Comparing the first and second eye aperture values to each other, the address selector 1502 selects one of the first and second address information that has the greater eye aperture value as the more reliable data. In this manner, the more reliable address information can be selectively obtained on a bit-by-bit basis. As described above, the address information stored in the second region 301 is more resistant to a defect caused by dust particles, for example, while the address information stored in the first region 300 is more resistant to a defect caused by a fingerprint, for example. Thus, according to the method of this preferred embodiment, highly reliable address information can always be obtained no matter whether the data recording side of the disc is soiled with dust particles or a fingerprint.

In the preferred embodiment described above, the first and second address decision circuits 1500 and 1501 output the first and second eye aperture values to the address selector 1502. Alternatively, first and second eye aperture ratios, obtained by normalizing the first and second eye aperture values of the first and second address detection signals with a reference signal, for example, may be output to the address selector 1502.

Figure 16:
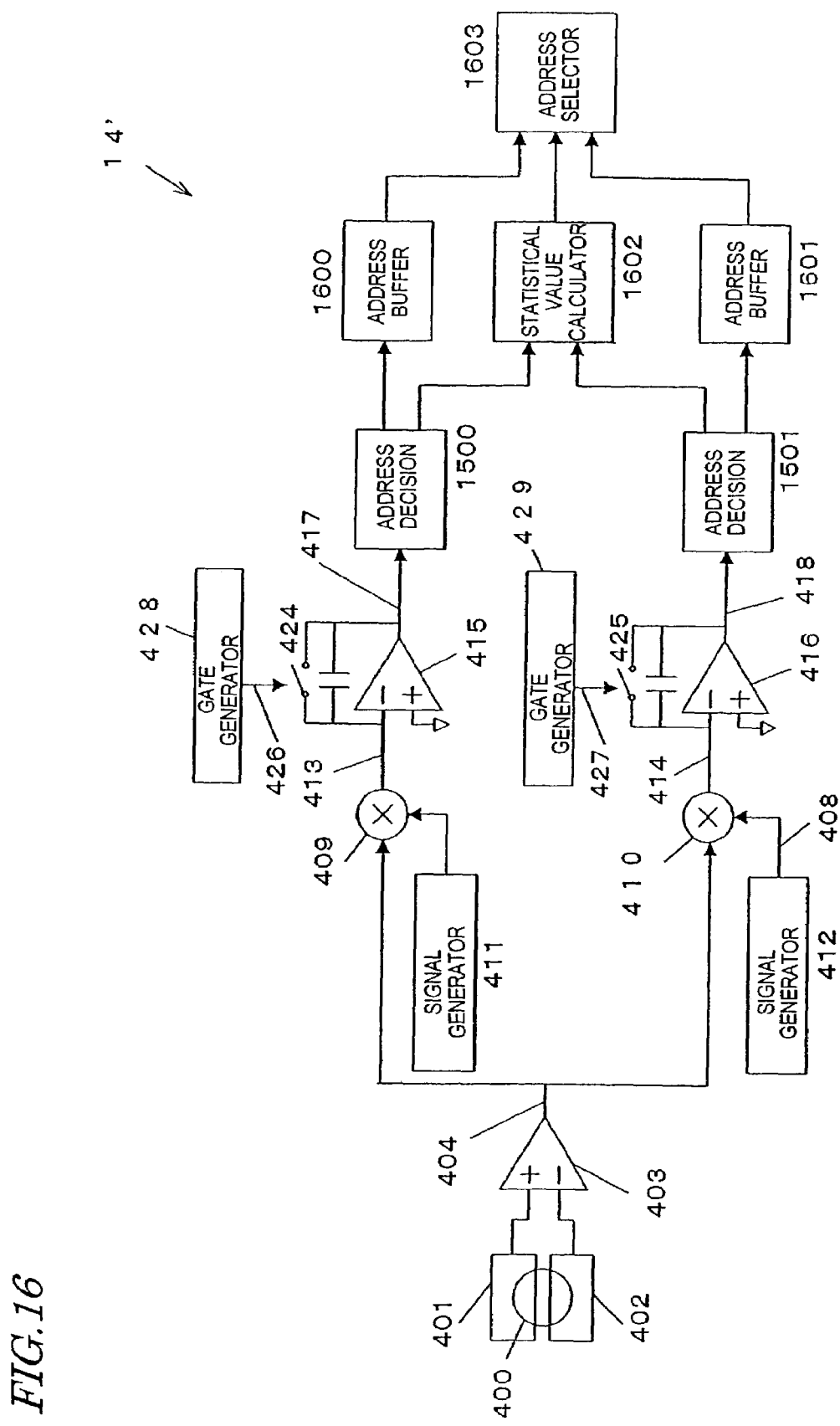
FIG. 16 is a block diagram showing a configuration for an address information reader according to a modified example of the fourth preferred embodiment.

The address information reader 14 compares the first and second address information to each other on a bit-by-bit basis. Alternatively, either the address information obtained from the first region 300 or the address information obtained from the second region 301 may also be selected on an address block basis. FIG. 16 is a block diagram showing a configuration for an alternative address information reader 14', which is a slight modification of the address information reader 14 shown in FIG. 15. The address information reader 14' includes not only all components of the address information reader 14 but also a first address buffer 1600, a second address buffer 1601 and a statistical value calculator 1602.

As shown in FIG. 16, the first address decision circuit 1500 outputs the first eye aperture values to the statistical value calculator 1602 and the first address information to the first address buffer 1600. The first address buffer 1600 stores thereon the first address information corresponding to one address block. That is to say, when the first address information is accumulated there to the amount corresponding to one address block, the first address buffer 1600 outputs the first address information to an address selector 1603 at a time. In the same way, the second address decision circuit 1501 outputs the second eye aperture values to the statistical value calculator 1602 and the second address information to the second address buffer 1601. The second address buffer 1601 stores thereon the second address information corresponding to one address block. That is to say, when the second address information is accumulated there to the amount corresponding to one address block, the second address buffer 1601 outputs the second address information to the address selector 1603 at a time.

The statistical value calculator 1602 calculates the average of the first eye aperture values that have been supplied there one bit after another in a period of time corresponding to one address block and the average of the second eye aperture values that have also been supplied there in the same period. Then, the statistical value calculator 1602 outputs a select signal to the address selector 1603 at the end of one address block to make the address selector 1603 select either the first address information or the second address information with the greater average of eye aperture values. In response to the select signal, the address selector 1603 selects either the first address information or the second address information. In this manner, the more reliable address information can be always selected on an address block basis.

It should be noted that if the first or second address information is selected based on the statistics of past eye aperture values, the first and second address buffers 1600 and 1601 may be omitted from the address information reader 14'. In that case, the first and second address decision circuits 1500 and 1501 sequentially supply the first and second address information bit by bit to the address selector 1603. The statistical value calculator 1602 calculates the average of the first eye aperture values that were supplied there for a predetermined range and the average of the second eye aperture values that were also supplied there for the same range. Then, the statistical value calculator 1602 outputs a select signal to the address selector 1603 to make the address selector 1603 select either the first address information or the second address information with the greater average of eye aperture values. In response to the select signal, the address selector 1603 selects either the first address information or the second address information that is sequentially supplied thereto.

Optionally, the statistical value calculator 1602 may also determine the address information to be selected by calculating any statistical values other than the average of the first eye aperture values and the average of the second eye aperture values. For example, the statistical value calculator 1602 may compare the average of squared first eye aperture values to that of squared second eye aperture values or the minimum value of the first eye aperture values to that of the second eye aperture values.

Embodiment 5

Figure 1:
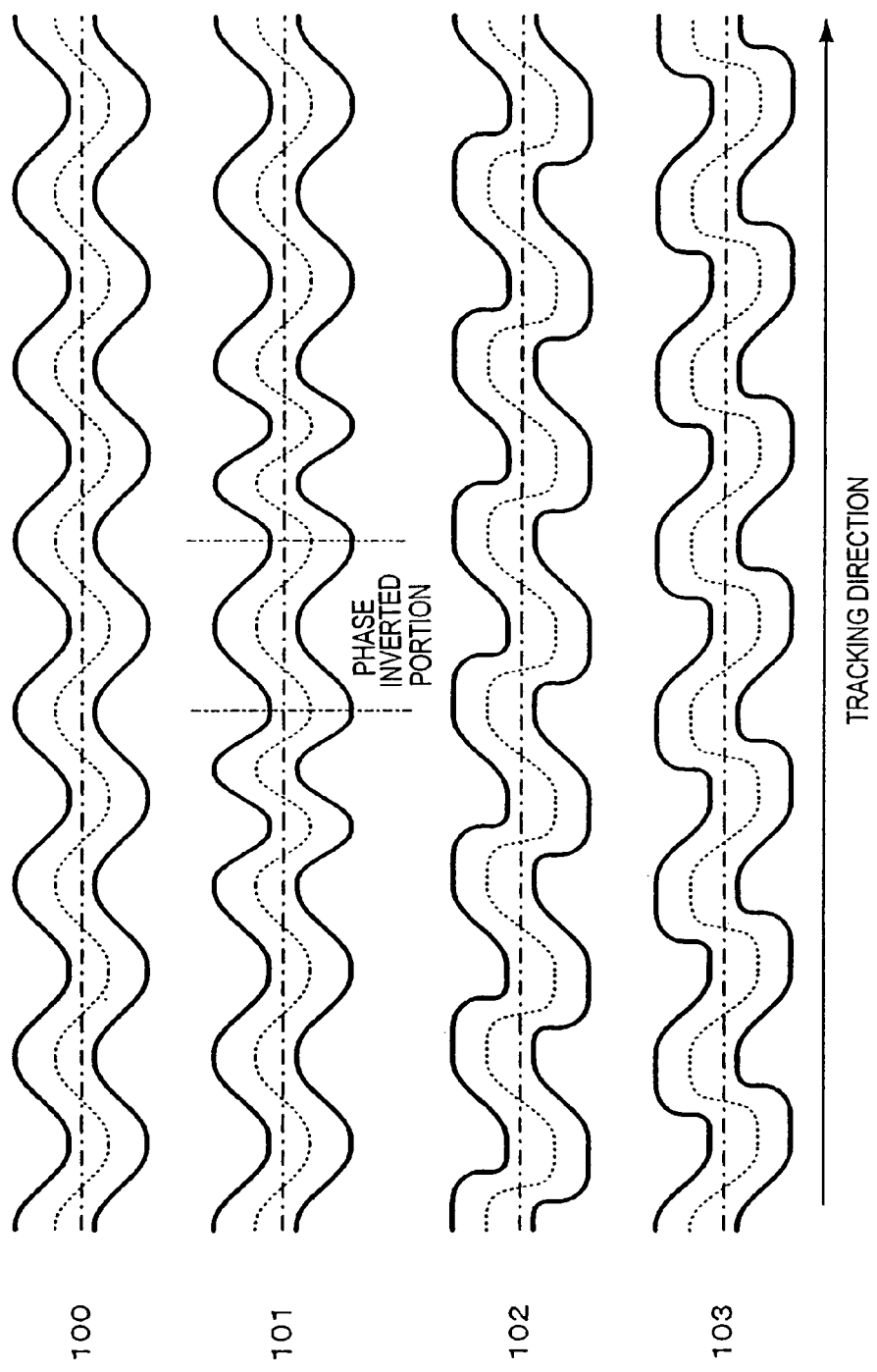
FIG. 1 schematically illustrates wobbled shapes of grooves on an optical disc.
Figure 2A:
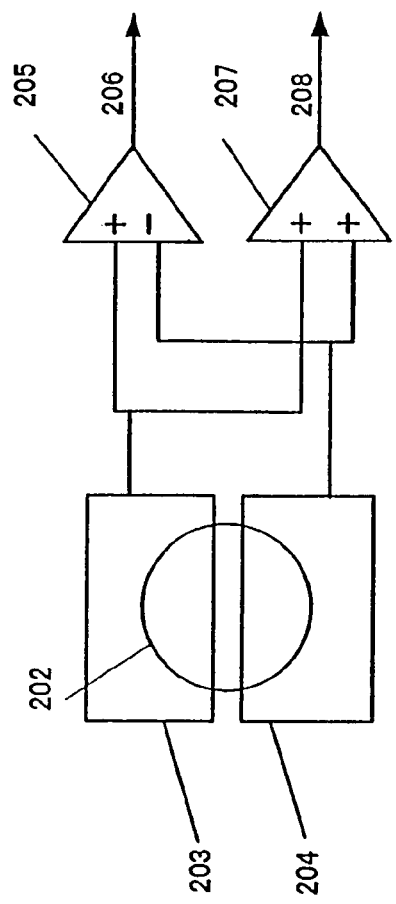
FIG. 2A is a block diagram showing a circuit for reading a groove shape.
Figure 2B:
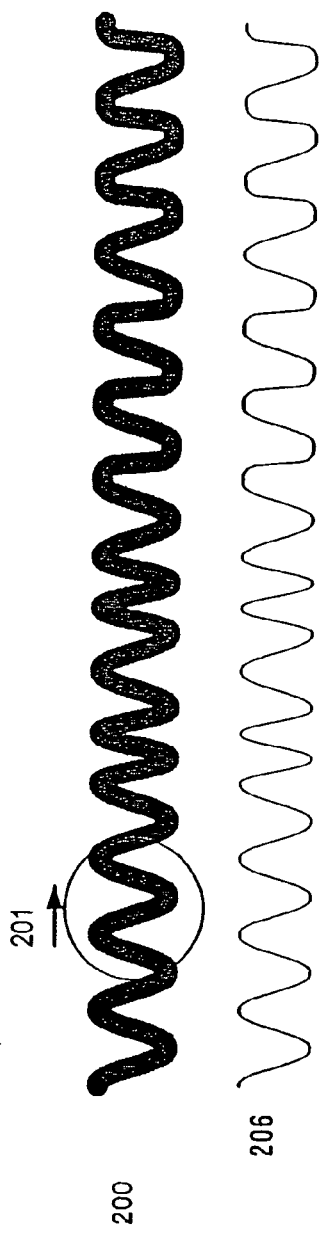
FIG. 2B shows an exemplary groove shape and the waveform of a read signal representing the groove shape.

Hereinafter, a method and apparatus for reading out address information according to a fifth specific preferred embodiment of the present invention will be described. First, the relationship between the address read signal and the user data read signal will be described with reference to FIG. 2. The user data read signal 208 is obtained by getting the outputs of the two detectors 203 and 204 added together by the adder 207. The change in the amplitude of the user data read signal 208 corresponds to the change in the intensity of the reflected light which is caused by the pits or marks provided on the disc as the user data. As described above, the address read signal 206 is also generated from the same two output signals of the detectors 203 and 204. Accordingly, if the user data read signal has deteriorated, it is naturally expected that the address read signal has also deteriorated. That is to say, the quality of the address read signal can be estimated by the property of errors that have occurred in the user data.

For example, suppose a burst error, or a series of consecutive errors, has occurred in the user data. In that case, if the range in which the burst error has occurred in the user data overlaps with almost the entire region in which the address information is stored, then the address information obtained is no longer reliable at all. The more frequently the burst errors occur, the more likely the almost entire overlap of the burst error range with the address information storage region. Also, the longer the average length of burst errors occurred, the more likely the almost entire overlap of the burst error range with the address information storage region. Furthermore, the smaller the area of the address information storage region, the more likely the almost entire overlap of the burst error range with the address information storage region.

As schematically illustrated in FIG. 3, the address information in the first region 300 is densely stored within a short range, while the address information in the second region 301 is dispersed over a longer range. Accordingly, as the frequency of occurrence of burst errors increases, the possibility of almost entire overlap of the burst error range with the first region 300 becomes even higher than that of almost entire overlap of the burst error range with the second region 301. Similarly, as the average length of burst errors that have occurred increases, the possibility of almost entire overlap of the burst error range with the first region 300 becomes even higher than that of almost entire overlap of the burst error range with the second region 301.

For that reason, if the frequency of occurrence of burst errors is relatively high, the second address information obtained from the second region 301 is more reliable than the first address information obtained from the first region 300. Accordingly, the second address information obtained from the second region 301 is preferably selected in that case. In the same way, if the average length of burst errors occurred is relatively large, the second address information obtained from the second region 301 is also more reliable than the first address information obtained from the first region 300. Accordingly, the second address information obtained from the second region 301 is also preferably selected in that case.

Conversely, if the burst errors rarely occur, then the first address information obtained from the first region 300 is preferably used. This is because the first address information that was recorded densely within a short range can be read out in a shorter time.

The preferred address information can be selected even more efficiently if the burst error occurred can be located. Specifically, if the first region 300 overlaps with the burst error range almost entirely, then the second address information obtained from the second region 301 may be selected. Also, even if not all but a predetermined percentage or more of the first region 300 overlaps with the burst error range, the second address information obtained from the second region 301 may also be selected as well.

The burst error may be detected either while uncorrected user data is being compared to corrected user data or while the errors of the user data are being corrected. Furthermore, if some information indicating a location in which a burst error is very likely present (e.g., missing information for use to decode product codes repeatedly) is available, then the burst error range may be specified in accordance with that information.

It should be noted that if the user data was interleaved, then the burst error may be defined by the physical continuity of the data that was recorded on the disc. For example, if random errors have occurred densely within a certain sector, then those errors may be regarded as constituting a burst error.

Furthermore, even without making error correction, the degree or the length of a burst error can be estimated roughly by measuring the depth or length of the envelope of the user data read signal. This method is not so accurate as the method that uses error correction codes. However, according to this method, the burst error can also be roughly estimated even in a region in which no user data is recorded. Also, if no user data has been recorded on the disc at all, the probability of errors may be estimated based on the state of the address read signal.

Figure 17:
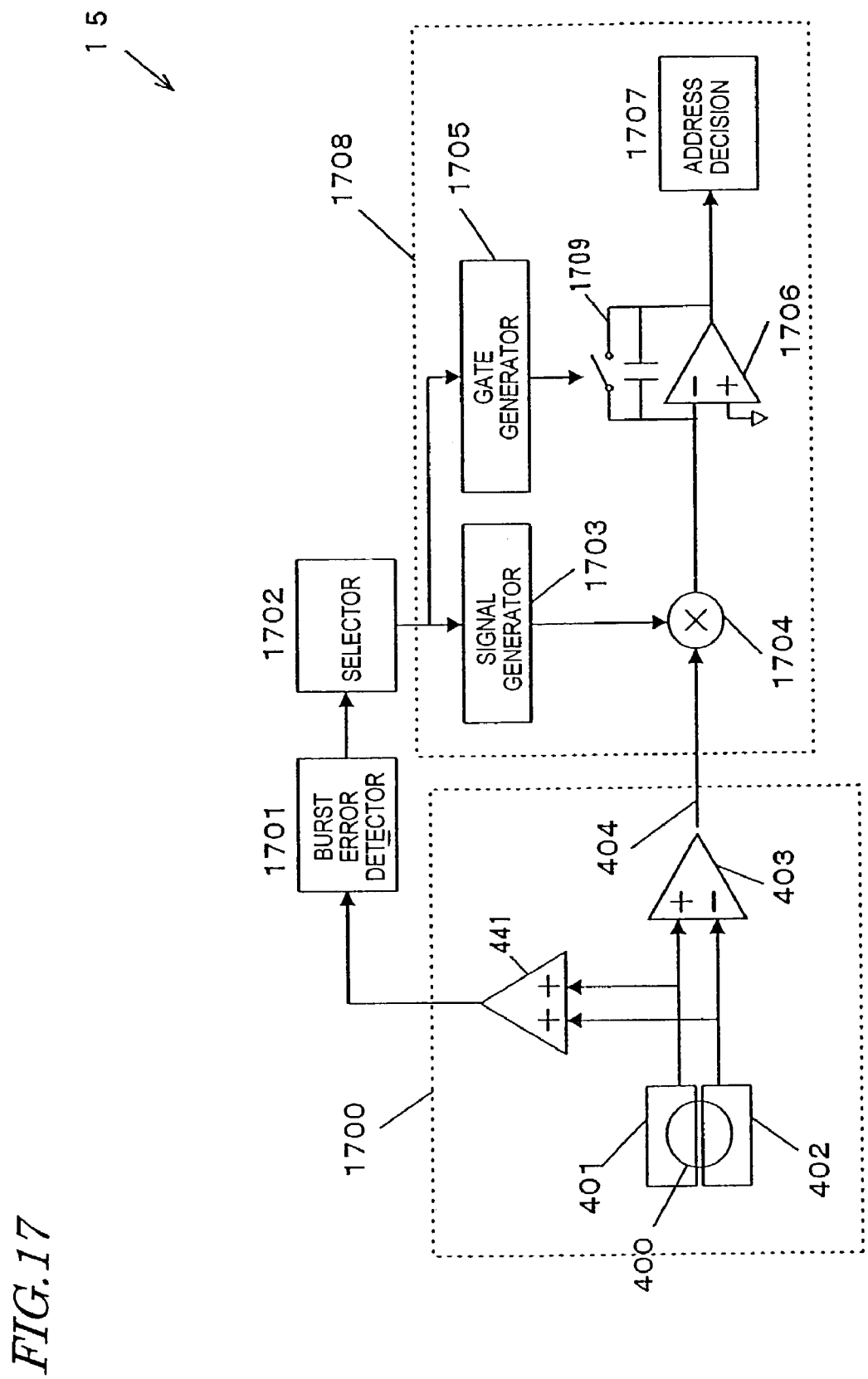
FIG. 17 is a block diagram showing a configuration for an address information reader according to a fifth specific preferred embodiment of the present invention.

Hereinafter, an address information reader 15 according to the fifth preferred embodiment will be described with reference to FIG. 17. FIG. 17 is a block diagram showing a configuration for the address information reader 15. As shown in FIG. 17, the address information reader 15 includes a read circuit 1700, a burst error detector 1701, a selector 1702 and an address detector 1708. The address detector 1708 includes a signal generator 1703, a multiplier 1704, a gate generator 1705 and an integrator circuit 1706.

In the read circuit 1700, an address read signal, having a signal waveform representing the groove shape, is output from a differential amplifier 403, while a user data read signal is output from an adder 441. On receiving the user data read signal, the burst error detector 1701 detects the frequency of occurrence or the average length of burst errors and then outputs the results to the selector 1702. The frequency of occurrence and the average length of burst errors may be detected by comparing uncorrected user data to corrected user data using the error correction code added to the user data, while carrying out the error correction process on the user data, or by using a flag indicating a location where the burst error is very likely present during the error correction process. The frequency of occurrence and average length of burst errors may also be detected by measuring the depth of the envelope of the user data read signal.

If the frequency of occurrence of burst errors is greater than a predetermined value or if the average length of burst errors is greater than another predetermined value, then the selector 1702 outputs a control signal, instructing that the second address signal to be obtained from the second region 301 should be selected, to the signal generator 1703 and the gate generator 1705. Otherwise, the selector 1702 outputs a control signal, instructing that the first address signal to be obtained from the first region 300 should be selected, to the signal generator 1703 and the gate generator 1705.

In response to the output signal of the selector 1702, the signal generator 1703 generates either a first reference signal if the first address signal should be selected or a second reference signal if the second address signal should be selected. The first reference signal is phase-locked to the sine wave address signal, has a phase that is either non-inverted or inverted to that of the address signal, and has the same frequency as the address signal. The second reference signal has a frequency twice as high as that of the sine wave address signal and is phase-locked to the address signal so as to share the same zero crossings with the address signal.

The multiplier 1704 multiplies together the first or second reference signal supplied from the signal generator 1703 and the address read signal supplied from the differential amplifier 403, and then outputs the product to the integrator circuit 1706.

In response to the output signal of the selector 1702, the gate generator 1705 generates and outputs either a first gate signal or a second gate signal to the switch 1709 of the integrator circuit 1706. Specifically, if the first address signal should be selected, the gate generator 1705 generates and outputs the first gate signal to the switch 1709, thereby turning the switch 1709 OFF such that the integrator circuit 1706 carries out the integration process while the first address signal is being output. On the other hand, if the second address signal should be selected, the gate generator 1705 generates and outputs the second gate signal to the switch 1709, thereby turning the switch 1709 OFF such that the integrator circuit 1706 carries out the integration process while the second address signal is being output.

In the period during which the first or second gate signal is being output, the integrator circuit 1706 carries out the integration process on the output signal of the multiplier 1704. Then, the integrator circuit 1706 outputs the integral at the end of the integration process as the address detection signal to the address decision circuit 1707. In response, the address decision circuit 1707 identifies the address information by the polarity of the address detection signal and then outputs the address information.

It should be noted that the multiplier 1704 selectively receives either the first reference signal or the second reference signal from the signal generator 1703 but receives both of the first and second address signals 405 and 406 from the differential amplifier 403. Accordingly, the multiplier 1704 automatically multiplies together reference and address signals in an unwanted combination. For example, the product of the second reference signal and the first address signal is also output from the multiplier 1704. However, the selector 1702 controls the gate generator 1705 such that integrator circuit 1706 integrates together only the products corresponding to the address signal that has been selected by the selector 1702. Accordingly, the product of the unwanted reference/address signal combination is not added to the sum. Thus, only the address information corresponding to the address signal that has been selected by the selector 1702 can be read out.

As described above, according to this preferred embodiment, the more reliable address information can be read out from the optical disc by taking into account the property of a burst error that has occurred.

The burst error detector 1701 may detect burst errors from a predetermined region of the groove on the optical disc or on a predetermined period basis. Also, if the burst error detector 1701 has detected the burst error from the first region 300, then the burst error detector 1701 may instruct the selector 1702 to select the second region 301.

In the address information reader 15 shown in FIG. 17, one of the first and second address signals is selectively detected based on the result obtained by the burst error detector 1701. Alternatively, both of the first and second address signals may be once detected and then one of these two signals may be selected.

Figure 18:
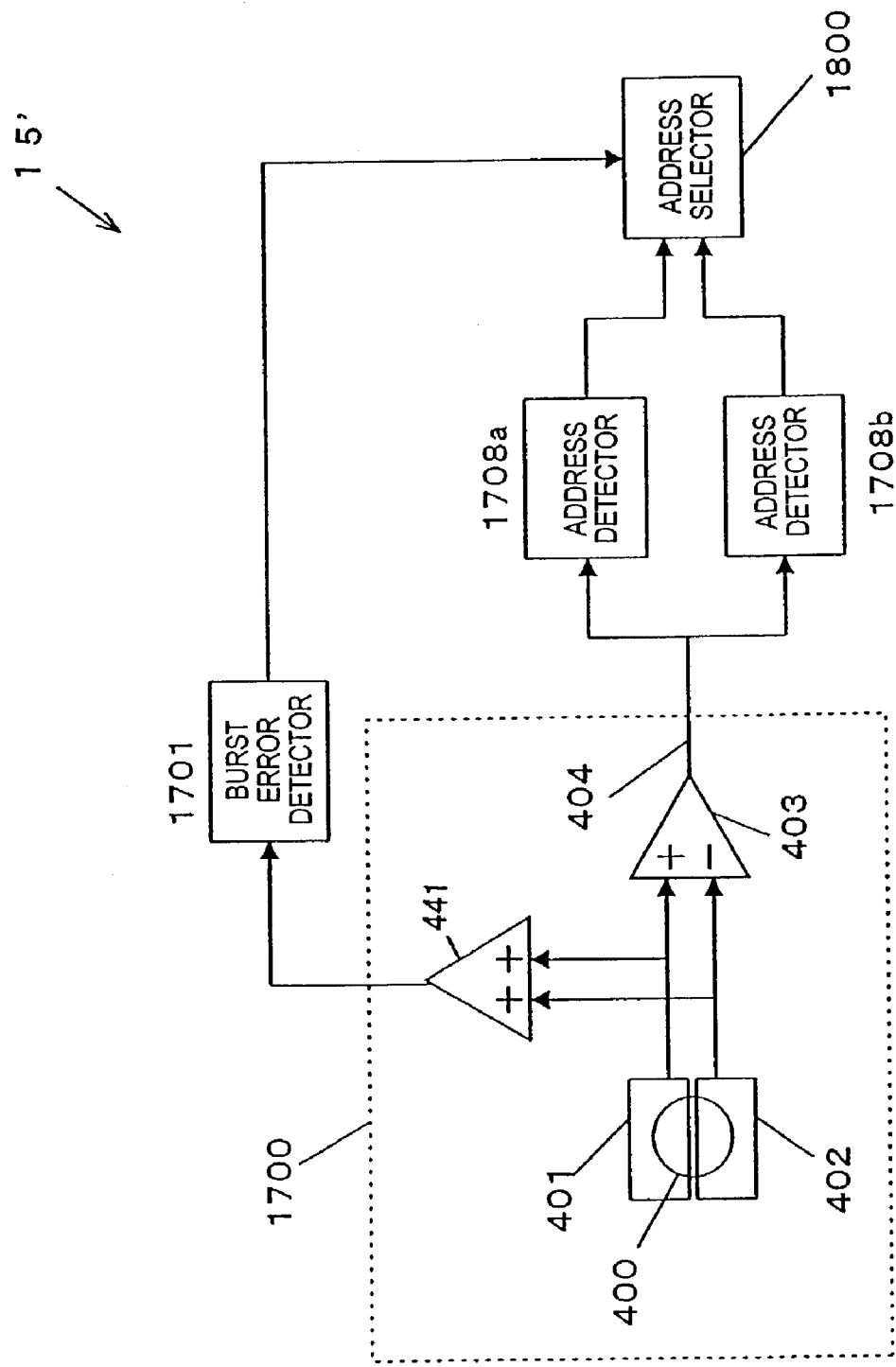
FIG. 18 is a block diagram showing a configuration for an address information reader according to a modified example of the fifth preferred embodiment.

FIG. 18 is a block diagram showing a configuration for such an address information reader 15'. As shown in FIG. 18, the address information reader 15' includes first and second address detectors 1708a and 1708b for detecting the first and second address signals, respectively, and an address selector 1800.

Although not shown in FIG. 18, the first address detector 1708a includes the first signal generator 411, multiplier 409, integrator circuit 415 and gate generator 428 shown in FIG. 4, detects only the first address signal and outputs the first address detection signal to the address selector 1800. In the same way, the second address detector 1708b detects only the second address signal and outputs the second address detection signal to the address selector 1800.

If the frequency of occurrence of burst errors is greater than a predetermined value or if the average length of burst errors is greater than another predetermined value, then the address selector 1800 selects the address detection signal supplied from the second address detector 1708b. Otherwise, the address selector 1800 selects the address detection signal supplied from the first address detector 1708a.

It should be noted that if the frequency of occurrence or the average length of burst errors is sufficiently small but if the address information obtained from the second region 301 is more reliable than the address information obtained from the first region 300, then the burst error detector 1701 may instruct the address selector 1800 to always select the second address signal obtained from the second region 301.

Embodiment 6

In the first, second, fourth and fifth preferred embodiments described above, an analog address read signal is processed as it is (i.e., without converting it into a digital signal). However, in each of these preferred embodiments, the analog address read signal may also be converted into a multi-bit digital signal and then processed.

Figure 19:
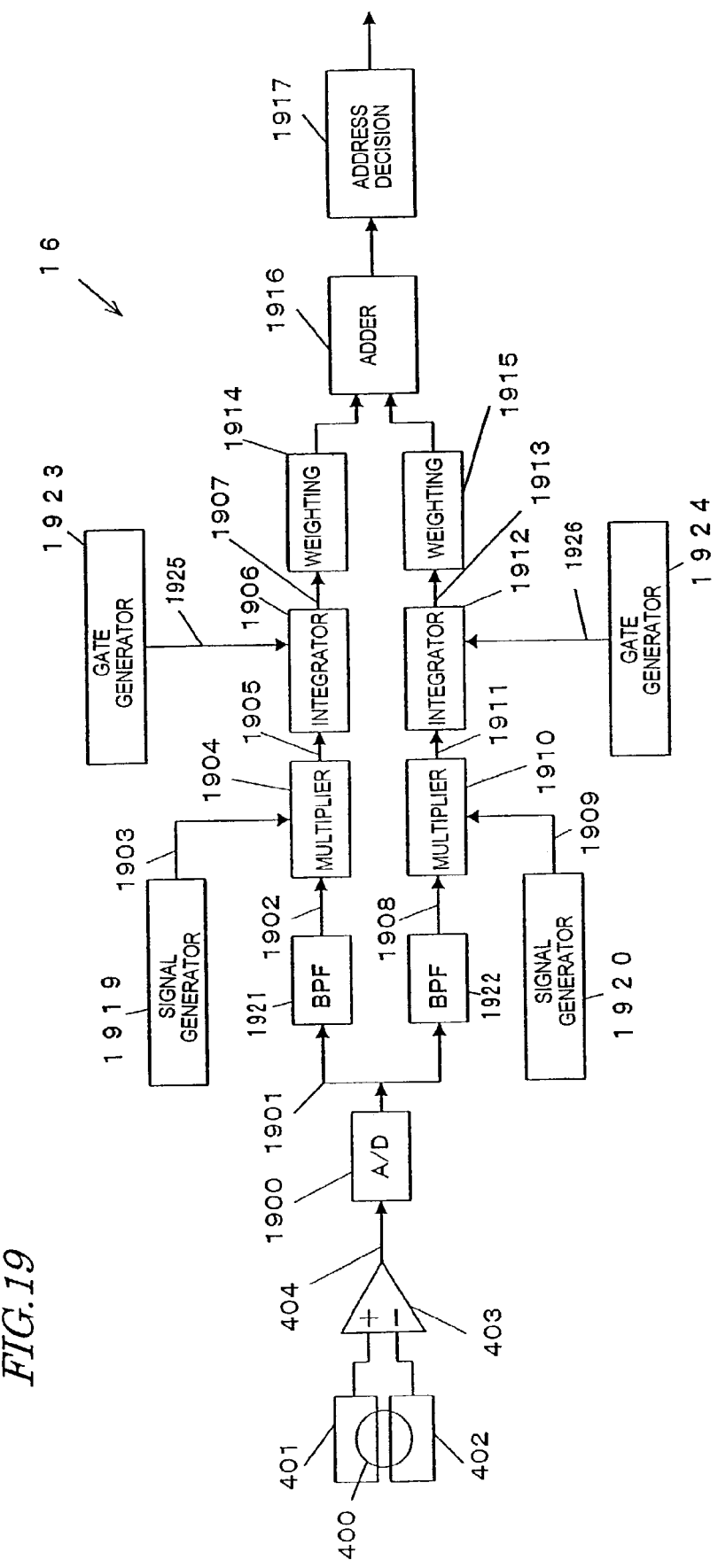
FIG. 19 is a block diagram showing a configuration for an address information reader according to a sixth specific preferred embodiment of the present invention.

FIG. 19 is a block diagram showing a configuration for an address information reader 16 according to a sixth specific preferred embodiment of the present invention. The address information reader 16 is obtained by modifying the address information reader 11 of the first preferred embodiment described above such that the address information reader 16 can perform digital signal processing.

In the address information reader 16 shown in FIG. 19, the detectors 401 and 402 receive the laser beam that has been reflected from the optical disc. The differential amplifier 403 calculates the difference between the output signals of the detectors 401 and 402, thereby outputting the address read signal 404. The address information reader 16 includes an A/D converter 1900, which converts the analog address read signal 404 into a multi-bit digital signal 1901. In this preferred embodiment, the A/D converter 1900 may have a sampling rate of about 22 MHz and may generate a 7-bit digital signal, for example. The A/D converter 1900 may have any other sampling rate and may generate a digital signal of any other number of bits.

In the address information reader 16, the digital signal 1901 passes a first band-pass filter (BPF) 1921, which limits the bandwidth of the digital signal 1901, thereby outputting a bandwidth-limited digital signal 1902 to a first multiplier 1904. The output signal 1903 of a first signal generator 1919 is a reference signal, which is phase-locked to a sine wave address signal, has a phase that is either non-inverted or inverted to that of the address signal, and has the same frequency as the address signal.

The first multiplier 1904 multiplies the output signal 1903 and the digital signal 1902 together, thereby outputting a multiplied signal 1905 to a first integrator circuit 1906. In response to a gate signal 1925 supplied from a first gate generator 1923, the first integrator circuit 1906 integrates the multiplied signal 1905 only while the first address signal is being read out from the first region 300. Then, responsive to a sampling pulse, the first integrator circuit 1906 outputs a first integral 1907.

Meanwhile, the digital signal 1901 also passes a second band-pass filter (BPF) 1922, which outputs a second harmonic component signal 1908 to a second multiplier 1910. The output signal 1909 of a second signal generator 1920 is a reference signal, which has a frequency twice as high as that of the sine wave address signal and which is phase-locked to the address signal.

The second multiplier 1910 multiplies the output signal 1909 and the second harmonic component signal 1908 together, thereby outputting a multiplied signal 1911 to a second integrator circuit 1912. In response to a gate signal 1926 supplied from a second gate generator 1924, the second integrator circuit 1912 integrates the multiplied signal 1911 only while the second address signal is being read out from the second region 301. Then, responsive to a sampling pulse, the second integrator circuit 1912 outputs a second integral 1913.

The first and second integrals 1907 and 1913 are output to, and weighted by, first and second weighting circuits 1914 and 1915, respectively. Then, the output signals of the weighting circuits 1914 and 1915 are added together by an adder 1916. In this preferred embodiment, the first and second weighting circuits 1914 and 1915 are used to equalize the first and second integrals 1907 and 1913 corresponding to the first and second address signals, respectively. Alternatively, the first and second weighting circuits 1914 and 1915 may add arbitrary weights to the first and second integrals 1907 and 1913.

An address decision circuit 1917 determines the output signal of the adder 1916 as data "0" or data "1" by the polarity thereof.

Such an address information reader including digital circuits can read out even more reliable address information. This is because possible variations among individual products of analog address information readers due to their temperature property and other characteristics would be reduced in this digital address information reader. This digital signal processing scheme is also applicable for use in the address information reader of the first, second, fourth or fifth preferred embodiment described above.

Embodiment 7

The address information reader of any of the preferred embodiments described above can be used effectively in an optical disc drive for reading and/or writing information from/on an optical disc.

Figure 20:
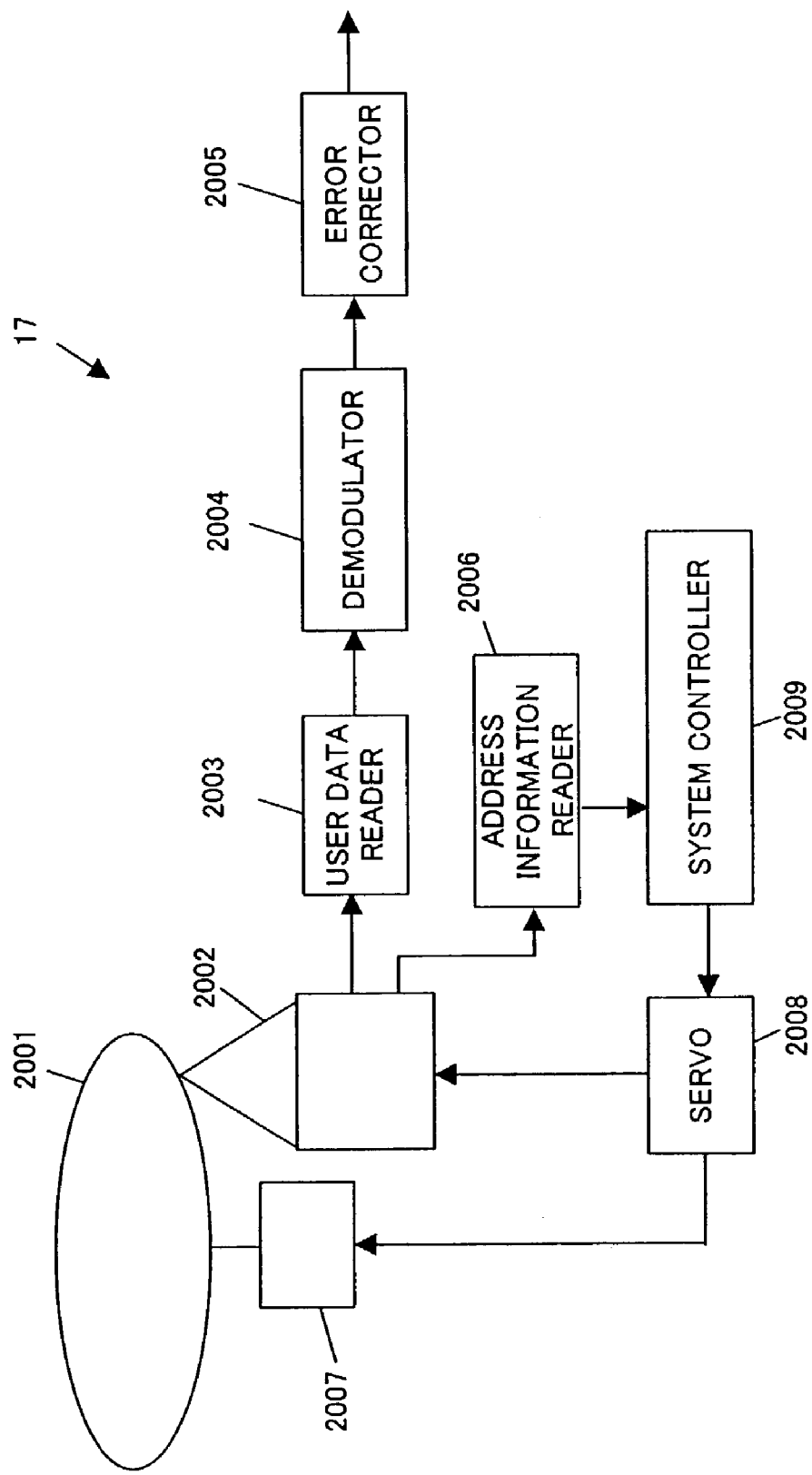
FIG. 20 is a block diagram showing a configuration for an optical disc drive according to a seventh specific preferred embodiment of the present invention.

FIG. 20 is a block diagram showing an exemplary optical disc drive 17. As shown in FIG. 20, the optical disc drive 17 includes a spindle motor 2007 for rotating an optical disc 2001 thereon, a servo circuit 2008, an optical pickup 2002, a user data reader 2003 and an address information reader 2006. Although not shown in FIG. 20, the optical pickup 2002 includes a laser diode for emitting a laser beam for use to read information from the optical disc 2001 and a photodetector to detect a reflected beam. If the optical disc drive 17 is constructed to perform a write operation also, the optical pickup 2002 further includes another laser diode for use to write information on the optical disc 2001. The user data reader 2003 obtains a user data read signal based on the output signal of the photodetector of the optical pickup 2002. The user data read signal is decoded into user data by way of a demodulator 2004 and an error correcting circuit 2005.

The address information reader 2006 may be the address information reader of any of the first through sixth preferred embodiments described above. In this preferred embodiment, however, the address information reader 2006 does not include the detectors 203 and 204 shown in FIG. 2 or the detectors 401 and 402 shown in FIG. 4, 8, 10, 11, 15, 16, 17, 18 or 19 because these detectors are included as the photodetector in the optical pickup 2002. The address information obtained by the address information reader 2006 is input to a system controller 2009, which controls the overall optical disc drive 17.

In the optical disc drive of this preferred embodiment, highly reliable address information can always be obtained by the address information reader. Accordingly, even if dust has been deposited on the optical disc or if scratches have been made on the optical disc, the optical disc drive can always read or write data accurately from/onto the intended location on the optical disc in accordance with the highly reliable address information.

Although not mentioned specifically for any of the first through sixth preferred embodiments, the method for reading out address information according to any of the preferred embodiments described above may be implemented either by hardware components such as electronic circuits or as a software program to be carried out by a microprocessor or the host computer of the optical disc drive. In the latter case, a computer readable program (or firmware) may be stored on a storage medium such as an EEPROM or a RAM to carry out the address reading method of the present invention.

Various preferred embodiments of the present invention described above provide a method and apparatus for reading out address information highly accurately or reliably even if the quality of a read signal has deteriorated for some reason, e.g., interference between adjacent tracks, variation in the tilt angle defined by the laser beam with respect to the disc surface, or dust or scratches on the data recording side.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A method for controlling read out of address information from an optical disc medium, the optical disc medium including a wobbled track groove on which a sine wave wobbled region, a first region and a second region are present and on which the same address information is recorded on the first and second regions, the first region including a plurality of sine wave wobbled portions, at least one of which has a phase inverted to that of the other portions, the second region including a plurality of wobbled portions that are steeply displaced either toward or away from the center of the optical disc medium with respect to a direction in which a laser beam scans the wobbled track groove, the method comprising:
a) obtaining a first address signal and a second address signal which represent groove shapes of the first and second regions from a reflected light which is obtained by having the laser beam scan along the wobbled track groove;
b) multiplying a first reference signal and the first address signal together to obtain a first multiplied signal, the first reference signal being phase-locked to, and having the same frequency as, a sine wave;
c) multiplying a second reference signal and the second address signal together to obtain a second multiplied signal, the second reference signal being phase-locked to a sine wave and having a frequency that is an even number of times as high as that of a sine wave;
d) integrating the first multiplied signal and the second multiplied signal separately to obtain a first integral and a second integral, respectively; and
e) adding the first and second integrals together to obtain a sum and thereby detecting the address information based on the sum.

2. The method for controlling read out of address information from an optical disc medium of claim 1, further comprising the step of sampling and holding the first integral or the second integral.

3. An apparatus for controlling read out of address information from an optical disc medium, the optical disc medium including a wobbled track groove on which a sine wave wobbled region, a first region and a second region are present and on which the same address information is recorded on the first and second regions, the first region including a plurality of sine wave wobbled portions, at least one of which has a phase inverted to that of the other portions, the second region including a plurality of wobbled portions that are steeply displaced either toward or away from the center of the optical disc medium with respect to a direction in which a laser beam scans the wobbled track groove, the apparatus comprising:
a signal reading unit operable to obtain a first address signal and a second address signal which represents groove shapes of the first and second regions from a reflected light which is obtained by having the laser beam scan along the wobbled track groove;
a signal generating unit operable to generate a first reference signal and a second reference signal, the first reference signal being phase-locked to, and having the same frequency as, a sine wave, the second reference signal being phase-locked to a sine wave and having a frequency that is an even number of times as high as that of a sine wave address signal;
a multiplying unit operable to multiply the first reference signal and the first address signal together and the second reference signal and the second address signal together to obtain a first multiplied signal and a second multiplied signal, respectively;
an integrating unit operable to integrate the first multiplied signal and the second multiplied signal separately to obtain a first integral and a second integral, respectively;
an adding unit operable to add the first and second integrals together to obtain a sum; and
a decision unit operable to detect the address information based on the sum.

4. The apparatus of claim 3, further comprising sample-and-hold unit operable to sample and hold the first integral or the second integral.

5. The apparatus of claim 4, wherein the multiplying unit includes:
a first multiplier for multiplying the first reference signal and the first address signal together, and
a second multiplier for multiplying the second reference signal and the second address signal together, and
wherein the integrating unit includes:
a first integrator circuit for integrating the first multiplied signal, and
a second integrator circuit for integrating the second multiplied signal.

6. A method for reading out information from an optical disc medium or recording information onto an optical disc medium the optical disc medium including a wobbled track groove on which a sine wave wobbled region, a first region and a second region are present and on which the same address information is recorded on the first and second regions, the first region including a plurality of sine wave wobbled portions, at least one of which has a phase inverted to that of the other portions, the second region including a plurality of wobbled portions that are steeply displaced either toward or away from the center of the optical disc medium with respect to a direction in which a laser beam scans the wobbled track groove, the method comprising:
a) detecting the laser beam that has been reflected from the wobbled track groove to obtain a first address signal and a second address signal that represent wobble of the first region, and wobble of the second region, respectively;
b) multiplying a first reference signal and the first address signal together to obtain a first multiplied signal, the first reference signal being phase-locked to, and having the same frequency as, a sine wave;
c) multiplying a second reference signal and the second address signal together to obtain a second multiplied signal, the second reference signal being phase-locked to a sine wave having a frequency that is an even number of times as high as that of a sine wave;
d) integrating the first multiplied signal and the second multiplied signal separately to obtain a first integral and a second integral, respectively;
e) adding the first and second integrals together to obtain a sum and thereby detecting the address information based on the sum; and f) reading out information from the optical disc medium or recording information onto the optical disc medium, based on the detected address information.

7. The method for reading out information from an optical disc medium or recording information onto an optical disc medium of claim 6, further comprising the step of sampling and holding the first integral or the second integral.

8. A method for controlling read out of information from an optical disc medium, the optical disc medium including a wobbled track groove on which a sine wave wobbled region, a first region and a second region are present and on which the same address information is redundantly recorded on the first and second regions, the first region including a plurality of sine wave wobbled portions, at least one of which has a phase inverted to that of the other portions, the second region including a plurality of wobbled portions that are steeply displaced either toward or away from the center of the optical disc medium with respect to a direction in which a laser beam scans the wobbled track groove;
the method comprising:
obtaining a first address signal and a second address signal which represent groove shapes of the first and second regions from a reflected light which is obtained by having the laser beam scan along the wobbled track grove; and
detecting address information based on both the first address signal and the second address signal.

9. A method for reading out information from an optical disc medium or recording information onto an optical disc medium, the optical disc medium including a wobbled track groove on which a sine wave wobbled region, a first region and a second region are present and on which the same address information is redundantly recorded on the first and second regions, the first region including a plurality of sine wave wobbled portions, at least one of which has a phase inverted to that of the other portions, the second region including a plurality of wobbled portions that are steeply displaced either toward or away from the center of the optical disc medium with respect to a direction in which a laser beam scans the wobbled track groove,
the method comprising:
detecting the laser beam that has been reflected from the wobbled track groove to obtain a first address signal and a second address signal that represent wobble of the sine wave wobbled region, wobble of the first region, and wobble of the second region, respectively;
detecting address information based on both the first address signal and the second address signal; and
reading out information from the optical disc medium or recording information onto the optical disc medium, based on the detected address information.

10. An optical disc device for reading out information from an optical disc medium or recording information onto an optical disc medium, the optical disc medium including a wobbled track groove on which a sine wave wobbled region, a first region and a second region are present and on which the same address information is recorded on the first and second regions, the first region including a plurality of sine wave wobbled portions, at least one of which has a phase inverted to that of the other portions, the second region including a plurality of wobbled portions that are steeply displaced either toward or away from the center of the optical disc medium with respect to a direction in which a laser beam scans the wobbled track groove,
the optical device comprising:
a signal reading unit operable to detect the laser beam that has been reflected from the wobbled track groove to obtain a first address signal and a second address signal that represent wobble of the first region, and wobble of the second region, respectively;
a signal generating unit operable to generate a first reference signal and a second reference signal, the first reference signal being phase-locked to, and having the same frequency as, a sine wave, the second reference signal being phase-locked to a sine wave and having a frequency that is an even number of times as high as that of a sine wave;
a multiplying unit operable to multiply the first reference signal and the first address signal together and the second reference signal and the second address signal together to obtain a first multiplied signal and a second multiplied signal, respectively;
an integrating unit operable to integrate the first multiplied signal and the second multiplied signal separately to obtain a first integral and a second integral, respectively;
an adding unit operable to add the first and second integrals together to obtain a sum;
a decision unit operable to detect the address information based on the sum; and
a recording and/or reproducing unit operable to read out information from the optical disc medium or record information onto the optical disc medium, based on the detected address information.

11. The optical disc device of claim 10, further comprising a sample-and-hold unit operable to sample and hold the first integral or the second integral.

12. The optical disc device of claim 11, wherein the multiplying unit includes:
a first multiplier for multiplying the first reference signal and the first address signal together, and
a second multiplier for multiplying the second reference signal and the second address signal together, and
wherein the integrating unit includes:
a first integrator for integrating the first multiplied signal, and
a second integrator for integrating the second multiplied signal.

13. An apparatus for controlling read out of address information from an optical disc medium, the optical disc medium including a wobbled track groove on which a sine wave wobbled region, a first region and a second region are present and on which the same address information is redundantly recorded on the first and second regions, the first region including a plurality of sine wave wobbled portions, at least one of which has a phase inverted to that of the other portions, the second region including a plurality of wobbled portions that are steeply displaced either toward or away from the center of the optical disc medium with respect to a direction in which a laser beam scans the wobbled track groove,
the apparatus comprising:
a signal reading out unit operable to obtain a first address signal and a second address signal which represent groove shapes of the first and second regions from a reflected light which is obtained by having the laser beam scan along the wobbled track groove; and
a detecting unit operable to detect address information based on both the first address signal and the second address signal.

14. An optical device for reading out information from an optical disc medium or recording information onto an optical disc medium, the optical disc medium including a wobbled track groove on which a sine wave wobbled region, a first region and a second region are present and on which the same address information redundantly recorded on the first and second regions, the first region including a plurality of sine wave wobbled portions, at least one of which has a phase inverted to that of the other portions, the second region including a plurality of wobbled portions that are steeply displaced either toward or away from the center of the optical disc medium with respect to a direction in which a laser beam scans the wobbled track groove, the optical device comprising:

a signal reading out unit operable to detect the laser beam that has been reflected from the wobbled track groove to obtain a first address signal and a second address signal that represent wobble of the first region, and wobble of the second region, respectively;

a detecting unit operable to detect address information based on both the first address signal and the second address signal; and a recording and/or reproducing unit operable to read out information from the optical disc medium or record information onto the optical disc medium, based on the detected address information.

* * * * *

UNITED STATES PATENT AND TRADEMARK OFFICE
CERTIFICATE OF CORRECTION

PATENT NO.         : 7,376,056 B2
APPLICATION NO.    : 10/346856
DATED              : May 20, 2008
INVENTOR(S)        : Masahito Nakao et al.

It is certified that error appears in the above-identified patent and that said Letters Patent is hereby corrected as shown below:

Column 26, line 4:
Delete "address signal";

Column 27, line 25:
Replace "grove" with -- groove --.

Signed and Sealed this

Third Day of March, 2009

JOHN DOLL
*Acting Director of the United States Patent and Trademark Office*